(12) United States Patent
Sato

(10) Patent No.: US 8,902,597 B2
(45) Date of Patent: Dec. 2, 2014

(54) THIN-FILM TRANSISTOR FORMING SUBSTRATE, SEMICONDUCTOR DEVICE, AND ELECTRIC APPARATUS

(75) Inventor: Takashi Sato, Chino (JP)

(73) Assignee: Seiko Epson Corporation, Tokyo (JP)

(*) Notice: Subject to any disclaimer, the term of this patent is extended or adjusted under 35 U.S.C. 154(b) by 95 days.

(21) Appl. No.: 13/304,770

(22) Filed: Nov. 28, 2011

(65) Prior Publication Data

US 2012/0140424 A1    Jun. 7, 2012

(30) Foreign Application Priority Data

Dec. 1, 2010    (JP) ................. 2010-268710

(51) Int. Cl.
*H05K 1/00*    (2006.01)

(52) U.S. Cl.
USPC .......................... 361/749; 361/765

(58) Field of Classification Search
USPC ................. 361/765, 749
See application file for complete search history.

(56) References Cited

U.S. PATENT DOCUMENTS

| 6,265,986 | B1 | 7/2001 | Oka et al. | |
|---|---|---|---|---|
| 2003/0141807 | A1* | 7/2003 | Kawase | 313/498 |
| 2004/0032637 | A1 | 2/2004 | Imamura | |
| 2005/0017268 | A1 | 1/2005 | Tsukamoto et al. | |
| 2007/0170505 | A1 | 7/2007 | Tokunaga | |
| 2013/0284816 | A1 | 10/2013 | Tokunaga | |

FOREIGN PATENT DOCUMENTS

| JP | 2000-075805 A | 3/2000 |
|---|---|---|
| JP | 4366743 B | 5/2000 |
| JP | 2002-040472 A | 2/2002 |
| JP | 2002-270377 A | 9/2002 |
| JP | 3551194 B | 5/2004 |
| JP | 2004-518994 A | 6/2004 |
| JP | 2005-244132 A | 9/2005 |
| JP | 2006-500607 A | 1/2006 |
| JP | 2006-508406 A | 3/2006 |
| JP | 2007-12781 A | 1/2007 |
| JP | 2007-200291 A | 8/2007 |
| JP | 2007-249231 A | 9/2007 |
| JP | 4189887 B | 9/2008 |
| JP | 2009-224665 A | 10/2009 |
| JP | 2010-2733 A | 1/2010 |
| WO | WO-96-41327 A | 12/1996 |
| WO | WO-02-61837 A | 8/2002 |
| WO | WO-2003-023745 A | 3/2003 |
| WO | WO-03-44765 A | 5/2003 |
| WO | WO-2004-022343 A | 3/2004 |
| WO | WO-2004-049045 A | 6/2004 |
| WO | WO-2010-098992 A | 9/2010 |

* cited by examiner

*Primary Examiner* — Andargie M Aychillhum
(74) *Attorney, Agent, or Firm* — ALG Intellectual Property, LLC

(57) ABSTRACT

A thin-film transistor forming substrate includes a substrate that has flexibility or elasticity and at least one electronic component that is disposed so as to be buried inside the substrate. The electronic component is configured so as to include one or more types of an IC, a capacitor, a resistor, and an inductor.

18 Claims, 32 Drawing Sheets

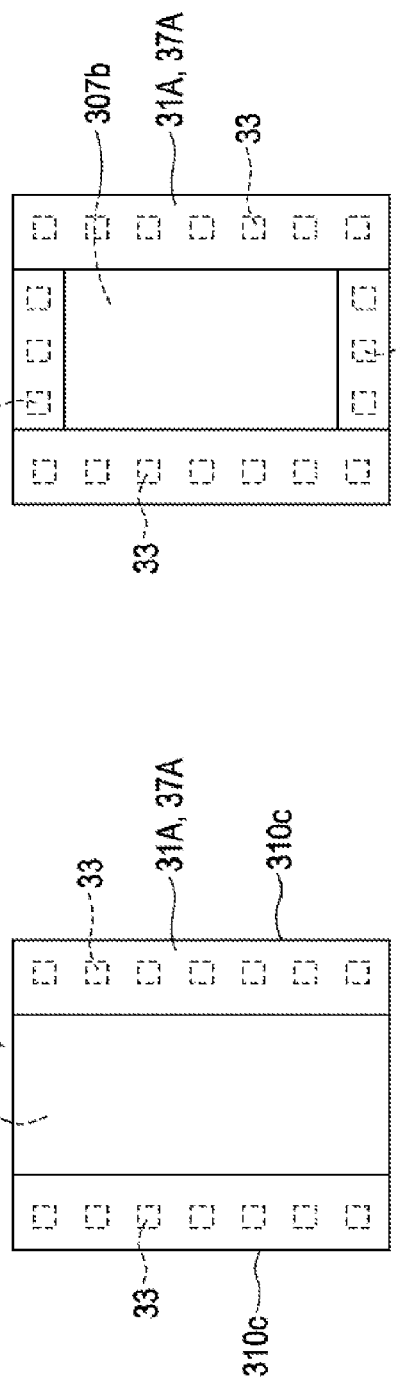
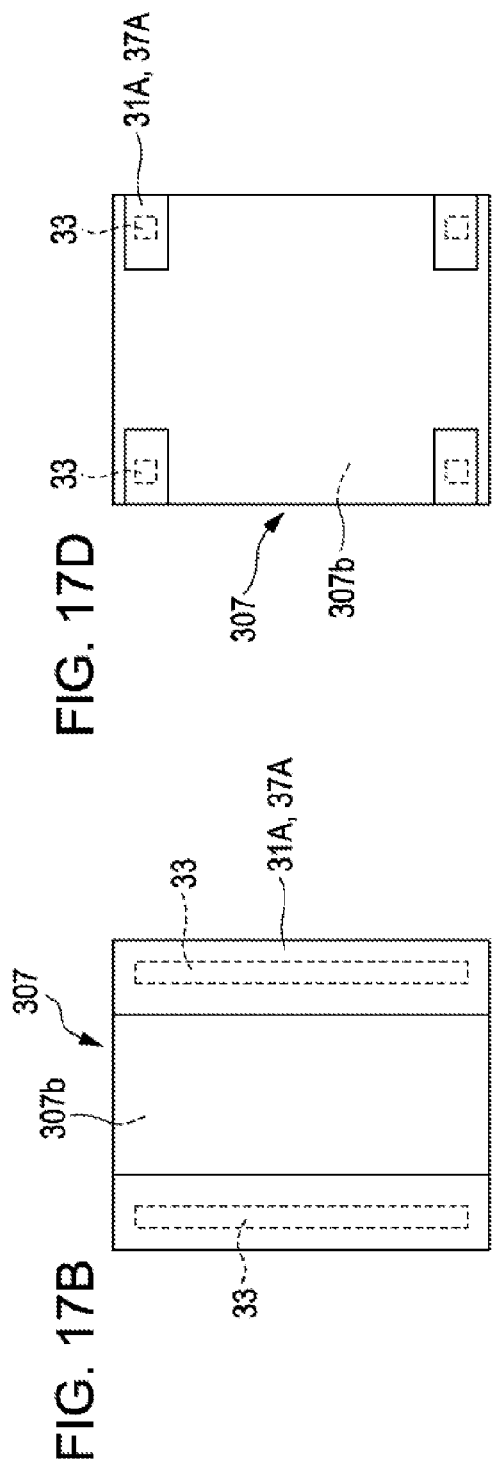

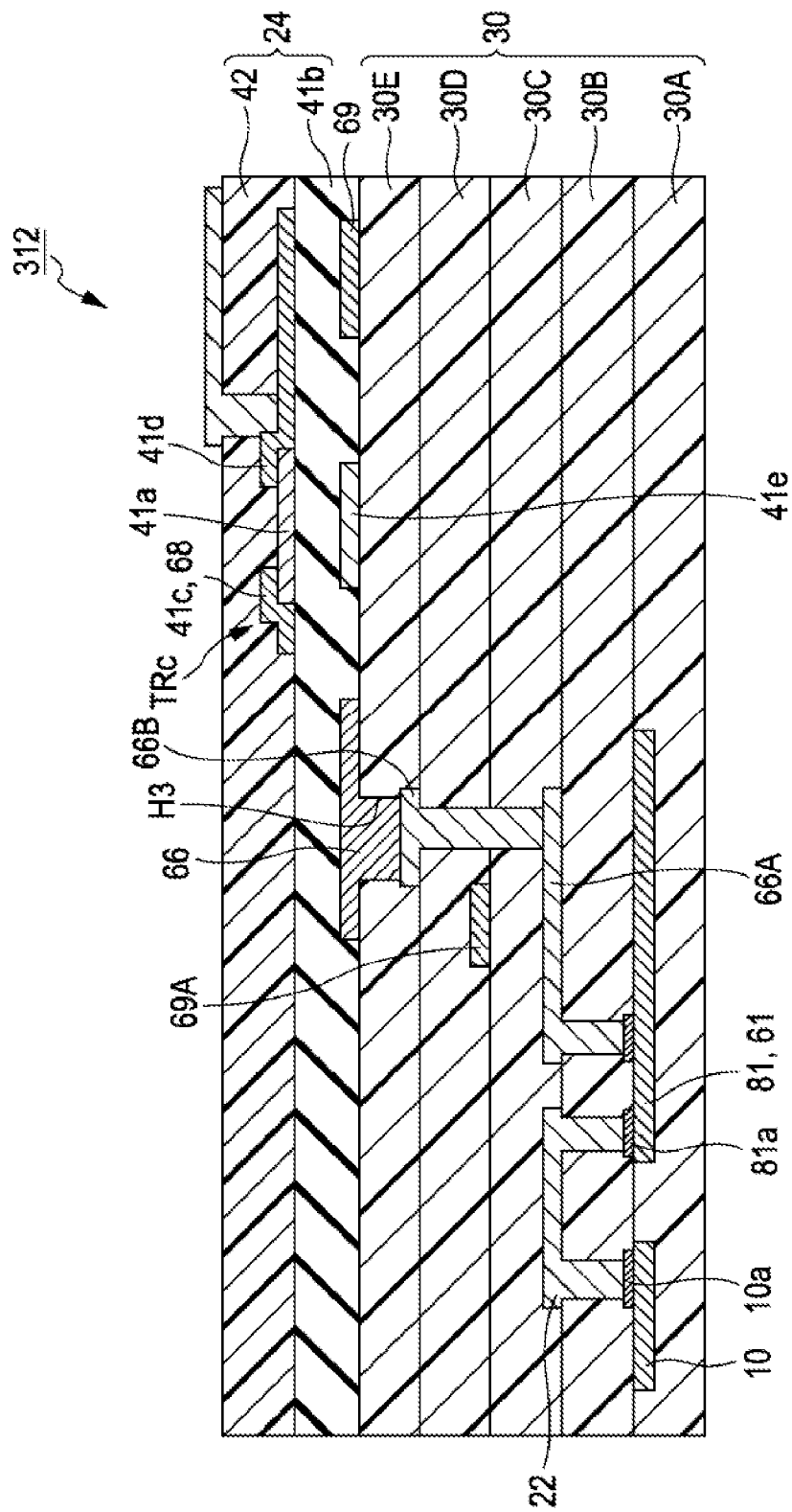

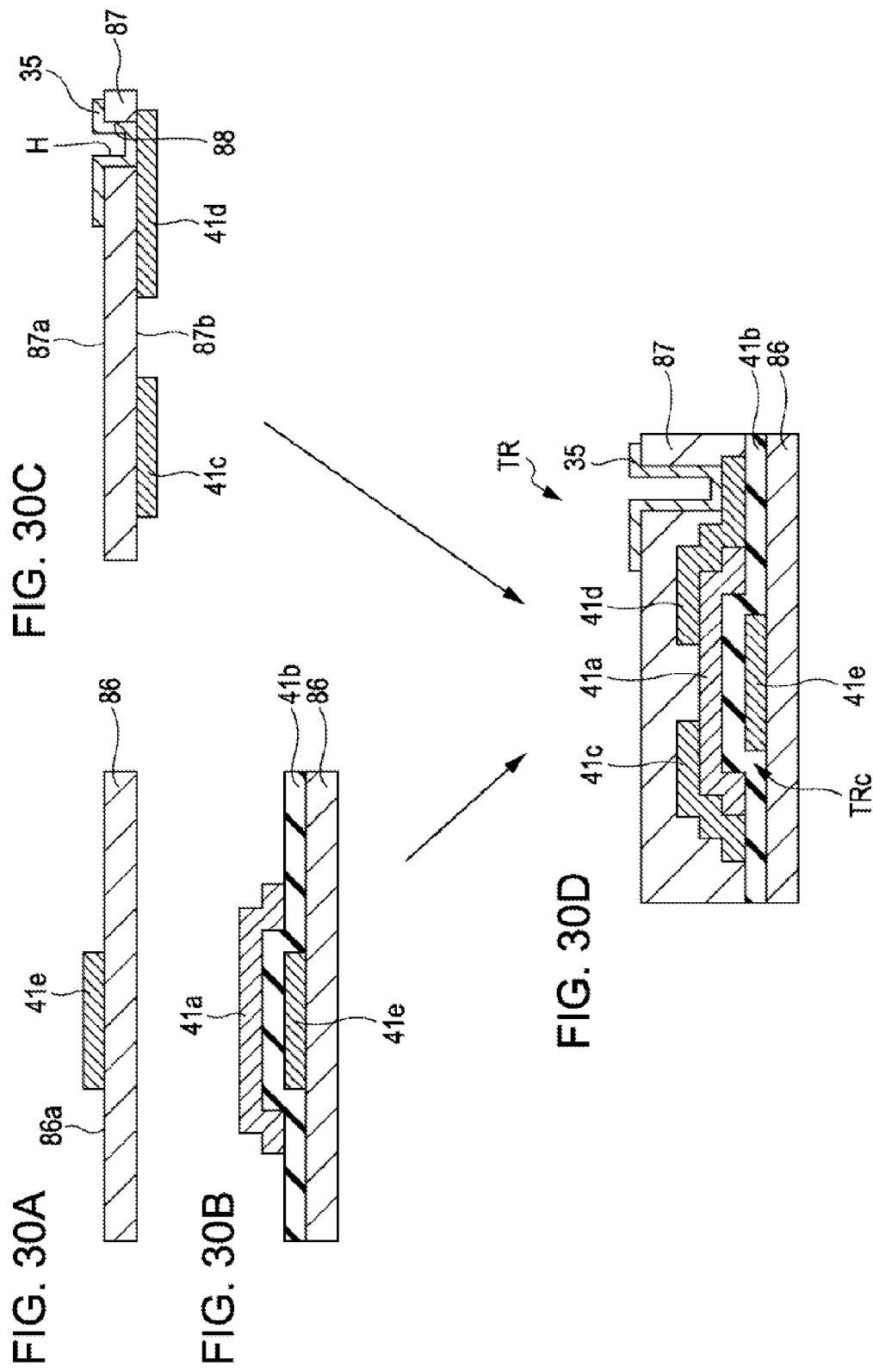

THIN-FILM TRANSISTOR FORMING SUBSTRATE, SEMICONDUCTOR DEVICE, AND ELECTRIC APPARATUS

BACKGROUND

1. Technical Field

The present invention relates to a thin-film transistor forming substrate, a semiconductor device, and an electric apparatus.

2. Related Art

Recently, a general configuration of a flat panel display (FPD) such as a liquid crystal device, an organic EL display device, or an electrophoretic display device is disclosed in JP-A-2007-249231 and Japanese Patent No. 4366743. In the general configuration, an active matrix of TFTs is formed on a component substrate formed from a rigid glass substrate, and a flexible substrate (hereinafter, also referred to as an FPC) in which driving circuits are mounted is connected to the component substrate.

In a structure illustrated in FIG. 37A, three flexible substrates 601 in which a scanning line driving circuit 61, a data line driving circuit 62, and a common power source circuit 64 are mounted are connected to three sides of a component substrate 600, and it is common to use the flexible substrates 601 in a state of being folded to the rear face side of the component substrate 600. However, there are problems in that the thickness of the device is increased, and a frame area used for connections with the flexible substrates 601 is necessary. Generally, the width of the frame is in the range of about 3 to 5 mm.

In addition, in order to decrease the frame area, a configuration is practically employed in a liquid crystal device or the like in which built-in drivers are included. As shown in FIG. 37B, the scanning line driving circuit 61, the data line driving circuit 62, and the common power source circuit 64, which are used for driving a display unit 5, are formed on the surface of a substrate 600A configuring the component substrate 600 as built-in drivers. An external circuit substrate 202 used for driving the above-described built-in drivers is connected to one side of the substrate 600A through the flexible substrate 601.

Even in a case where low temperature polysilicon (LIPS) TFTs are used as TFTs configuring the built-in drivers, they are components having a mobility of 100 $m^2$/V/sec. Thus, in order to bury the built-in drivers, a dead space of about several mm is necessary on each side of a display area.

In addition, as shown in FIGS. 37A and 37B, an external circuit substrate 202 is connected to at least one side of the substrate 600 through connection substrates 201 and 601, and the flexible substrates 601 are used in a state of being folded to the rear face side of the component substrate 600. Accordingly, as described above, this has an adverse effect on a decrease in the thickness, the weight, or the like of the device. Furthermore, since the external circuit substrate 202 is rigid, up to three sides of the FPD can be formed to be flexible. However, all four sides of the FPD cannot be formed to be flexible.

Although not yet implemented, a transfer process called a SUFTLA (Surface Free Technology by Laser Ablation) (registered trademark) or an EPLaR technique (Electronics on Plastic by Laser Release) has the following problems.

Currently, the flexible substrate is connected by being clamped to the component substrate such as a glass substrate that has high rigidity. When such mounting is performed for the component substrate having flexibility, a connection defect occurs immediately after the connection of the flexible substrate 601 or during use, so that a defect such as the formation of a short circuit or the like frequently occurs. Accordingly, there is a problem from the viewpoint of reliability.

In JP-A-2006-508406, although a substrate having flexibility in which an insulating polymer is used as the core is used as a metallic foil substrate, the above-described problems of the frame are not solved.

In addition, in JP-T-2004-518994 and Japanese Patent No. 3551194, although driving circuits are mounted on the surface of a component substrate, from the viewpoint of handling, there are practical problems such as the reliability of IC connection and the like. Although ICs are connected to the uppermost surface of the substrate, a thin-film organic EL is directly formed on the driving circuits, and accordingly, the reliability of the connection of the driving circuits is not enhanced. In addition, there is a problem from the viewpoint of robustness. Furthermore, in Japanese Patent No. 4189887, ICs are mounted on the rear face side of a substrate in an exposed state, or the ICs are covered with a rigid thermal diffuser, whereby there is a problem of flexibility.

As above, in order to realize a flexible display device, there is an object of devising a flexible substrate.

SUMMARY

An advantage of some aspects of the invention is that it provides a thin-film transistor forming substrate, a semiconductor device, and an electric apparatus that is thin, light and flexible and can realize a small size, a light weight, and high reliability owing to a small thickness, a small frame, and the like.

According to a first aspect of the invention, there is provided a thin-film transistor forming substrate including: a substrate that has flexibility or elasticity; and at least one electronic component that is disposed so as to be buried inside the substrate.

According to the above-described thin-film transistor forming substrate, the electronic component is buried inside the substrate having flexibility. Accordingly, even in a case where the thin-film transistor forming substrate is used in a bent state, the electronic component can be maintained well, whereby the elasticity and the robustness are superior.

In addition, an arrangement gap between a plurality of ICs may be configured to be equal to or more than a length of one side of each one of the ICs, and be more preferably equal to or more than three times the length of the one side.

In such a case, by configuring the arrangement gap between the ICs (electronic components) to be equal to or more than the length of one side of each IC, the ICs are prevented from blocking the bending of the thin-film transistor forming substrate. Accordingly, the thin-film transistor forming substrate can be used in a gently bent state, for example, like a desk pad as stationery, and therefore the versatility thereof is improved.

In addition, the electronic component may be configured so as to include one or more types of an IC, a capacitor, a resistor, and an inductor.

Furthermore, it may be configured such that the substrate is formed by laminating a plurality of base members, and the electronic component is buried inside one of the plurality of base members or the plurality of base members that are consecutive to one another, or each one of a plurality of the electronic components is buried inside one different base member or the plurality of the base members that are consecutive to one another.

In such a case, by burying the electronic components inside different base members, the electronic components can be arranged so as to overlap each other in the plan view. Alternatively, when the electronic component is thicker than the base member of one layer, the electronic component may be maintained over a plurality of the base members. In such a case, a decrease in the size of a device configured by using the thin-film transistor forming substrate can be realized.

In addition, it may be configured such that a plurality of buried wirings is arranged between different base members, and one buried wiring and the other buried wiring connected to each other are connected through a plurality of contact holes, which are disposed in the plurality of base members present between the one and other buried wirings, having different cross-sectional areas.

In such a case, in a case where the buried wirings are connected to each other through a plurality of the base members, by connecting the buried wirings through a plurality of contact holes having different cross-sectional areas, compared to a configuration in which the buried wirings are connected through one contact hole passing through the plurality of the base members, a defective connection can be prevented relatively well.

According to a second aspect of the invention, there is provided a semiconductor device including: a substrate that has flexibility or elasticity; and a semiconductor element that is formed on the substrate. The substrate is formed from the above-described thin-film transistor forming substrate.

According to the above-described semiconductor device, even in a case where the semiconductor device is used in a bent state, the electronic components can be maintained well inside the substrate. Therefore, a semiconductor device having superior elasticity and superior robustness can be acquired.

In addition, the semiconductor element may be an active element.

In such a case, since the semiconductor element is an active element, the pixel circuit can be configured, whereby the semiconductor device can be used as a component substrate of a display device.

According to a third aspect of the invention, there is provided an electric apparatus including: a component substrate that has flexibility or elasticity; an opposing substrate, which is arranged so as to face the component substrate, having flexibility or elasticity; a functional element that is arranged between the component substrate and the opposing substrate; a plurality of first electrodes that are disposed in the component substrate; a second electrode that is disposed in the opposing substrate; and a driving circuit that is used for driving the functional element. The component substrate is formed from the above-described semiconductor device, and the electronic component is connected to the driving circuit.

According to the above-described electric apparatus, since the electronic components are buried inside the substrate, a generally-used rigid substrate that is used for a connection with an external circuit is not necessary. Accordingly, an electric apparatus that has superior elasticity and superior robustness can be acquired. In addition, even in a case where the electric apparatus is used in a bent state, the electronic components can be maintained well inside the substrate.

In addition, it may be configured such that the electronic component includes ICs, capacitors, resistors, or inductors and an arrangement gap between a plurality of the ICs is equal to or more than a length of a longer side of an adjacent electronic component in the direction of the adjacent electronic component, and is more preferably equal to or more than three times the length of the longer side.

In such a case, by configuring an arrangement gap between the ICs to be equal to or more than a length of one side of each one of the ICs, the electric apparatus can be used in a gently bent state, for example, like a desk pad as stationery. In addition, by configuring the arrangement gap to be three times or more of the one side of each IC, flexibility can be improved.

In addition, the functional element may be configured to be a display element that has a display unit formed from a plurality of pixels.

In such a case, a connection substrate used for mounting an external circuit does not need to be arranged in the component substrate unlike a general case. Accordingly, a display device that is thin and light like paper and has high elasticity can be realized. In addition, the miniaturization, the light weight, and the high robustness owing to a decrease in the thickness of the entire display device, the narrowness of the frame, and the like can be realized, whereby the versatility of the display device (electric apparatus) can be improved.

In addition, at least one electronic component may be configured to be disposed so as to overlap the functional element in the plan view.

In such a case, the miniaturization of the electric apparatus can be realized. When the electric apparatus is used as a display device, by arranging the electronic components so as to overlap the functional element in the plan view, the display area can be enlarged, and the frame can be narrowed.

In addition, it may be configured such that an external connection electrode connected to the electronic component is disposed on a face of the semiconductor element forming substrate that is on a side opposite to the driving circuit layer of the semiconductor element forming substrate.

In such a case, the miniaturization and a decrease in the thickness of the entire apparatus can be realized. In addition, in a case where the apparatus is used as a display device, an area used for forming the external connection electrode does not need to be secured on the surface of the component substrate, and accordingly, the display area can be broadened, and the frame can be narrowed.

In addition, the external connection electrode may be configured to be disposed so as to overlap the functional element in the plan view.

In such a case, the miniaturization of the apparatus can be realized. In addition, in a case where the apparatus is used as a display device, an area used for forming the external connection electrode does not need to be secured on the surface of the component substrate, and accordingly, the display area can be broadened, and the frame can be narrowed.

In addition, it may be configured such that at least a part of the opposing substrate extends on a face of the component substrate that is located on a side opposite to the functional element of the component substrate, and the extended portion and the external connection electrode are connected to each other through a vertical conduction portion.

In such a case, a predetermined voltage is applied to the opposing substrate side through the vertical conduction portion. Accordingly, the vertical conduction portion does not need to be disposed on the surface of the component substrate, and accordingly, a space for forming the vertical conduction portion other than an arrangement space for the functional element does not need to be secured on the component substrate. Therefore, for example, in a case where the electric apparatus is used as a display device, the display area can be secured to be broadened, and the frame can be narrowed.

In addition, it may be configured such that the functional element and the electronic component are connected to each other through a connection wiring, and a communication circuit that is a communication control unit and an antenna that is a communication unit connected to the communication circuit are disposed as the electronic components, and the antenna is disposed in a same layer as that of the connection wiring.

In such a case, the antenna and the connection wiring can be simultaneously formed, whereby the manufacturing thereof can be easily performed.

In addition, it may be configured such that a battery cell that is a power supply unit is disposed as the electronic component, and the battery cell is disposed on a face of the component substrate that is located on a side opposite to the functional element of the component substrate.

In such a case, the battery cell, which is a power supply unit, as the electronic component is disposed on the rear face (a face opposite to a face in which the functional element is disposed) of the component substrate, and accordingly, even in a case where the charging life cycle is shortened, the replacement thereof can be performed in an easy manner.

In addition, a concave portion that houses the electronic component in the component substrate and a lid portion that seals the concave portion may be configured to be included.

In such a case, the electronic component can be reliably maintained without protruding from the component substrate, and, by sealing the concave portion in which the electronic component is housed by using the lid portion, the falling of the electronic component can be prevented further.

In addition, the component substrate may be configured so as to have moisture-resistance for the functional element.

In such a case, the moisture resistance for the functional element can be increased, whereby an increase in the power consumption due to an increase in the leakage current can be prevented. Accordingly, an excellent display can be performed for a long period, whereby reliability can be improved.

BRIEF DESCRIPTION OF THE DRAWINGS

The invention will be described with reference to the accompanying drawings, wherein like numbers reference like elements.

FIGS. 17A to 17D are plan views showing examples of the arrangement of vertical conduction portions disposed on the rear face side of a component substrate.

FIG. 29 is a partial cross-sectional view showing a detailed configuration of a component substrate.

FIGS. 30A to 30D are process diagrams showing a method of manufacturing a thin-film transistor having a BGTG structure.

DESCRIPTION OF EXEMPLARY EMBODIMENTS

Hereinafter, embodiments of the invention will be described with reference to the accompanying drawings. In each diagram used for the description presented below, in order to allow each member to have a recognizable size, the scale of each member is appropriately changed.

First Embodiment

Figure 1:
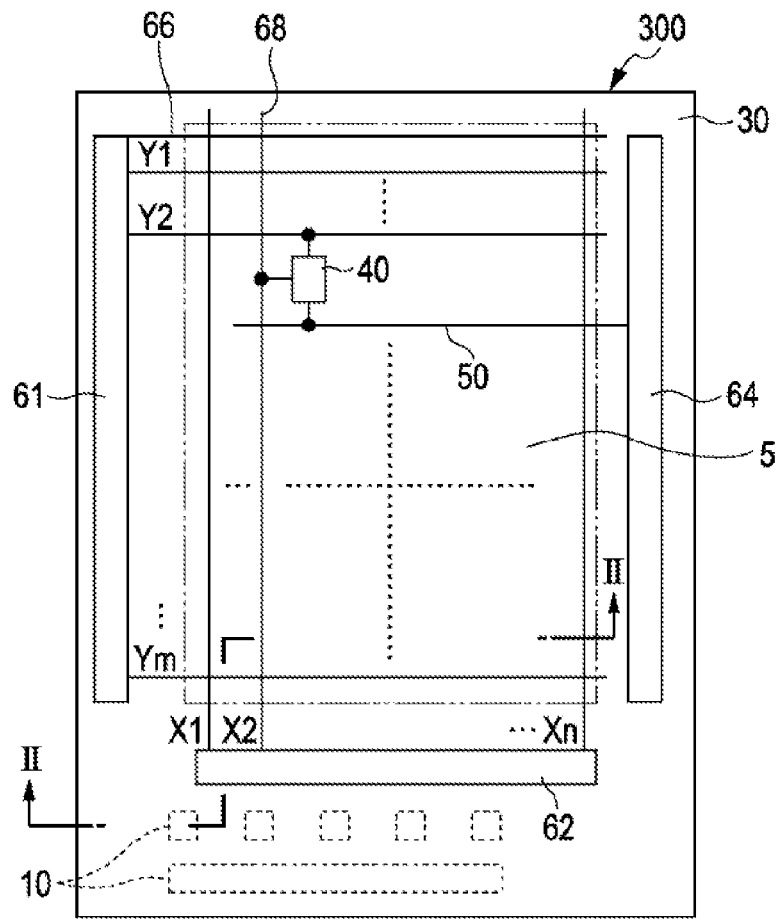
FIG. 1 is a plan view showing the configuration of a component substrate, which configures an electric apparatus, according to a first embodiment.
Figure 2:
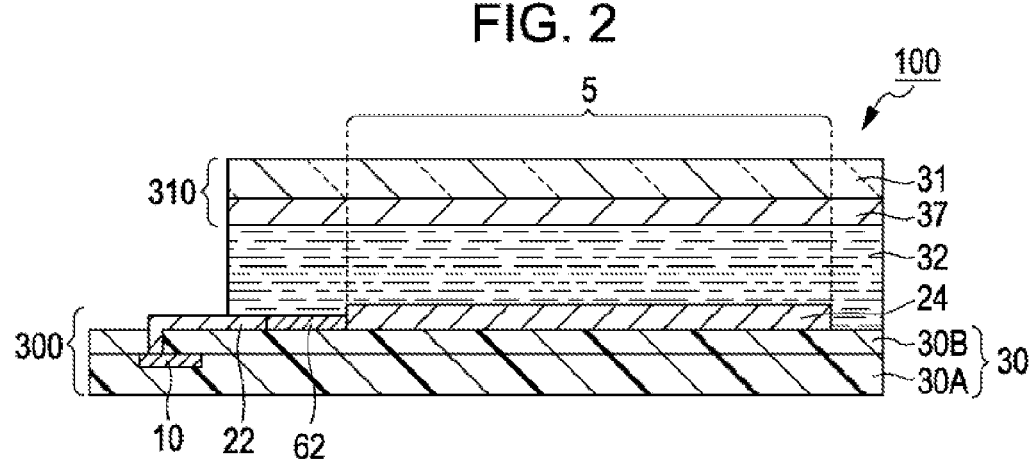
FIG. 2 is a cross-sectional view showing a schematic configuration of an electric apparatus.

FIG. 1 is a plan view showing the configuration of a component substrate, which configures an electric apparatus, according to a first embodiment. FIG. 2 is a cross-sectional view showing a schematic configuration of an electric apparatus.

As shown in FIGS. 1 and 2, an electro-optical device (electric apparatus) 100 according to this embodiment is configured so as to include a component substrate (semiconductor device) 300 and an opposing substrate 310, which have flexibility, and an electro-optical element (functional element) 32 interposed therebetween.

The component substrate 300 is formed from a first substrate (thin-film transistor forming substrate) 30 and a driving circuit layer 24 former thereon. A first substrate 30 is mainly configured by one pair of laminated base members 30A and 30B and a plurality of electronic components 10 buried on the base member 30B side of the base member 30A. The driving circuit layer 24 is mainly configured by a control transistor TRc that drives an electro-optical element 32 and is disposed for each pixel 40, a scanning line driving circuit 61 that drives the control transistor, a data line driving circuit 62, and a common power supply circuit 64. A connection wiring 22 that connects the electronic component 10 and each circuit or a thin-film transistor disposed inside the driving circuit layer 24 is disposed inside the first substrate 30 and the driving circuit layer 24.

Here, each circuit disposed inside the driving circuit layer 24 is so-called a built-in driver that is formed on the first substrate 30 by using a driving transistor TRs. However such a configuration is not limited thereto. Thus, a configuration may be employed in which a driving driver 51 formed from the electronic component (IC) is buried in the first substrate 30. For example, such a configuration will be described in a ninth embodiment.

In FIGS. 1 and 2, in an area in which the component substrate 300 and the opposing substrate 310 overlap each other, the display unit 5 is formed in which a plurality of pixels 40 is arranged in a matrix pattern. On the periphery of the display unit 5, that is, on the component substrate 300 that overhangs to the outer side of the opposing substrate 310, the scanning line driving circuit 61, the data line driving circuit 62, and the common power supply circuit 64 are arranged, and a plurality of the electronic components 10 including a controller (a control unit or a control circuit) 63 is built.

In the display unit 5, a plurality of scanning lines 66 extending from the scanning line driving circuit 61 and a plurality of data lines 68 extending from the data line driving circuit 62 are formed, and the pixels 40 are disposed in correspondence with the intersection positions thereof. In addition, a plurality of power supply lines 50 extends from the common power supply circuit 64 to the display unit 5. The power supply line 50 is disposed in correspondence with the scanning line 66 of each row and is connected to the pixels 40 of a corresponding row. The common power supply circuit 64 is configured such that an electric potential can be individually input to each power supply line 50. The power supply line 50 can serve as a holding capacitor line.

The scanning line driving circuit 61 is connected to the pixels 40 through m scanning lines 66 (Y1, Y2, . . . , Ym), under the control of the controller 63, sequentially selects the first to m-th scanning lines 66, and supplies a respective selection signal that defines the On-timing of the control transistor TRc (see FIG. 2) disposed for each pixel 40 through the selected scanning line 66.

The data line driving circuit 62 is connected to the pixels 40 through n data lines 68 (X1, X2, . . . , Xn) and, under the control of the controller 63, sequentially supplies image signals that define respective pixel data corresponding to each pixel 40 to the pixels 40. The common power supply circuit 64 generates various signals to be supplied to power supply lines 50 connected thereto under the control of the controller 63.

Figure 3:
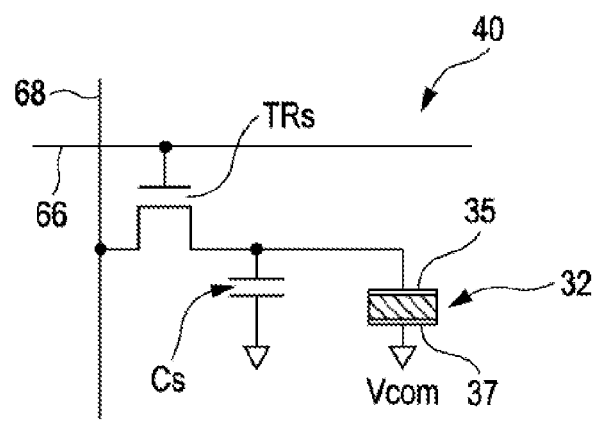
FIG. 3 is an equivalent circuit diagram of one pixel.

FIG. 3 is an equivalent circuit diagram of one pixel.

In each pixel 40, a control transistor (semiconductor element) TRc, a holding capacitor Cs, a pixel electrode (first electrode) 35, an electro-optical element (functional element) 32, and an opposing electrode 37 are disposed. In addition, the scanning line 66, the data line 68, and the power supply line 50 are connected to each pixel 40. The control transistor TRc is an N-MOS (Negative Metal Oxide Semiconductor) transistor.

In addition, the thin-film transistor that configures the pixel 40 may be replaced by a switching element of a different type having a function equivalent thereto. For example, instead of the N-MOS transistor, a P-MOS transistor may be used.

In the pixel 40, the scanning line 66 is connected to the gate of the control transistor TRc, and the data line 68 is connected to the source. The drain of the control transistor TRc is connected to one electrode of the holding capacitor Cs and the pixel electrode 35. The other electrode of the holding capacitor Cs is connected to a capacitor line not shown in the figure or the power supply line 50 (FIG. 1). In addition, between the pixel electrode 35 and the opposing electrode 37, an electro-optical element 32 is interposed.

The control transistor TRc is a switching element that controls the input of an image signal to the pixel 40, and an image signal voltage supplied through the control transistor TRc is maintained in the holding capacitor Cs. Then, the electro-optical element 32 is driven by a current according to the voltage of the holding capacitor Cs.

Figure 4:
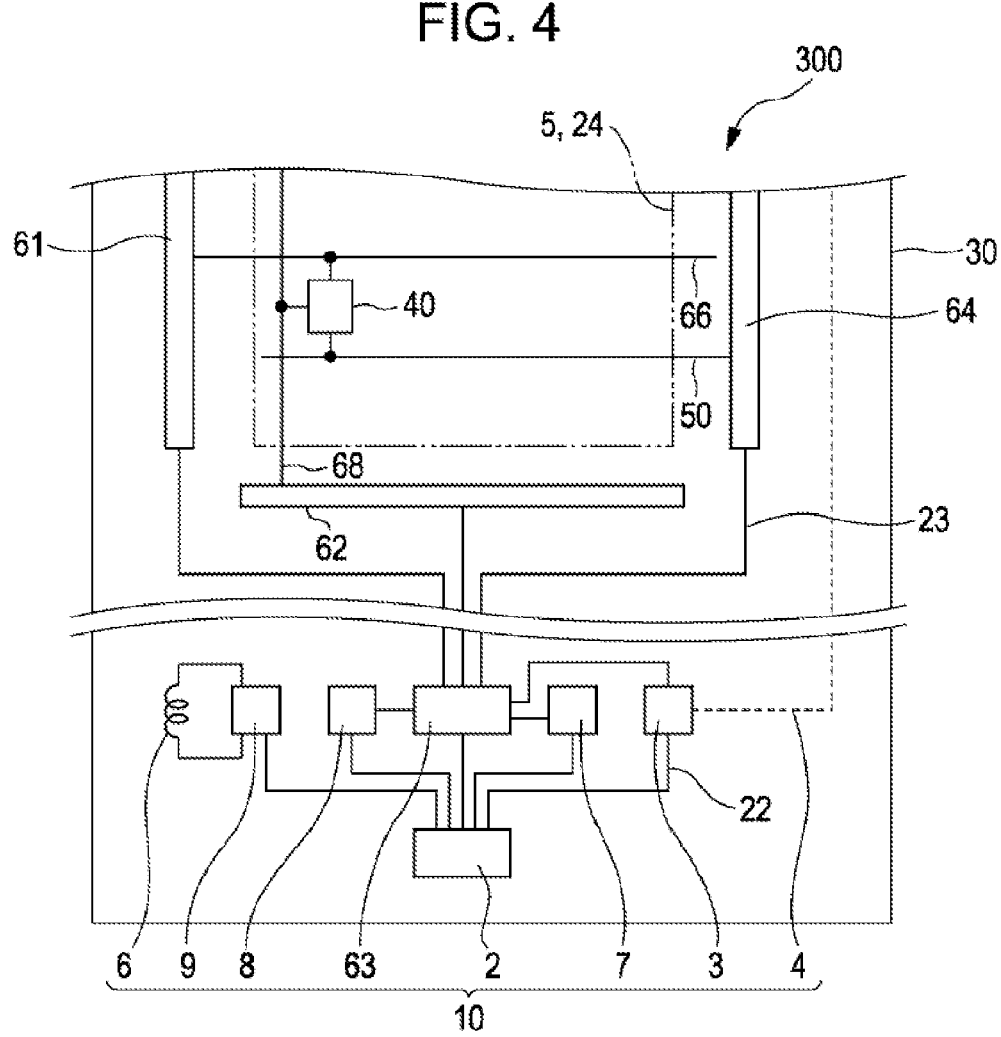
FIG. 4 is an enlarged plan view showing a main portion of a component substrate.

FIG. 4 is an enlarged plan view showing a main portion of the component substrate.

As shown in FIG. 4, a plurality of the electronic components 10 (FIG. 1) is buried inside the first substrate 30 that configures the component substrate 300. The electronic components 10 buried inside the first substrate 30 are a controller 63 as a display control unit, a battery cell 2 as a power supply unit, a communication circuit 3 as a communication control unit, an antenna 4 as a communication unit that is connected to the communication circuit 3, a memory 7 formed from an SRAM as a storage unit for display data, a coil 6 as a charging unit for non-contact charging, a charging control circuit 9 as a communication control unit (power supply control unit) to which the coil is connected, and a calculation circuit 8 as a calculation unit having the function of calculating display data. The controller 63, the memory 7, the communication circuit 3, the calculation circuit 8, and the charging control circuit 9 are connected to the battery cell 2.

The scanning line driving circuit 61, the data line driving circuit 62, and the common power supply circuit 64 described above are connected to the controller 63. This controller 63 comprehensively controls the electro-optical device (electric apparatus) 100 based on image data or a synchronization signal supplied from a higher-level device.

Here, although the coil 6 is formed in a small area located on the side of the charging control circuit 9, it may be formed in a large area (a peripheral edge portion of the component substrate 300) that is the periphery of the display unit 5 and further surrounds the periphery of the driving circuits 61 and 62.

Although described later in detail, an IC having a size (in this embodiment, for example a 1 mm square) smaller than a general IC (generally, a square of about 1.0×10 mm) is used. In addition, the ICs (electronic components 10) are arranged with a gap larger than one side of each IC. Thus, when a first substrate 30 and a second substrate 31 that are formed from flexible substrates (FPCs) are bent, the electronic components 10 are configured so as not block the bending of the substrates.

Next, the burial of the electronic components and the like will be described in detail.

In addition, it is additionally noted that the configuration of the electronic components 10 to be buried inside the first substrate 30 and the components are not limited to those described above. Here, in this embodiment, although the electronic components 10 are described to be buried on the periphery of the display unit 5, the invention is not limited thereto. Thus, for example, some or all of the electronic components may be buried inside the display unit 5 or on the lower side of the scanning line driving circuit 61, the data line driving circuit 62, and the common power supply circuit 64.

Here, it is especially important that an electro-optical device 100, in which all four sides located on the periphery of the electro-optical device (electric apparatus) 100 have flexibility, can be realized by burying a circuit element, which is generally externally attached, inside the first substrate 30. In a method using a SUFTLA technique, an Eplar technique, or the like in which thin-film transistors are formed on the component substrate 300 formed from one base member, it is necessary to arrange an external circuit on the periphery of the display unit 5. In such a case, since the external circuit is mounted on a rigid substrate, only three sides have flexibility.

By realizing flexibility of all four sides as in this embodiment, for the first time, an electro-optical device 100 having the flexibility like paper can be realized. In addition, since a plurality of electronic components 10 is buried in the first substrate 30, a substrate for a connection with an external circuit that is used for mounting the electronic component 10 on the surface of the component substrate is not necessary. Accordingly, a light weight and a small thickness of the component substrate 300 can be realized.

Figure 5:
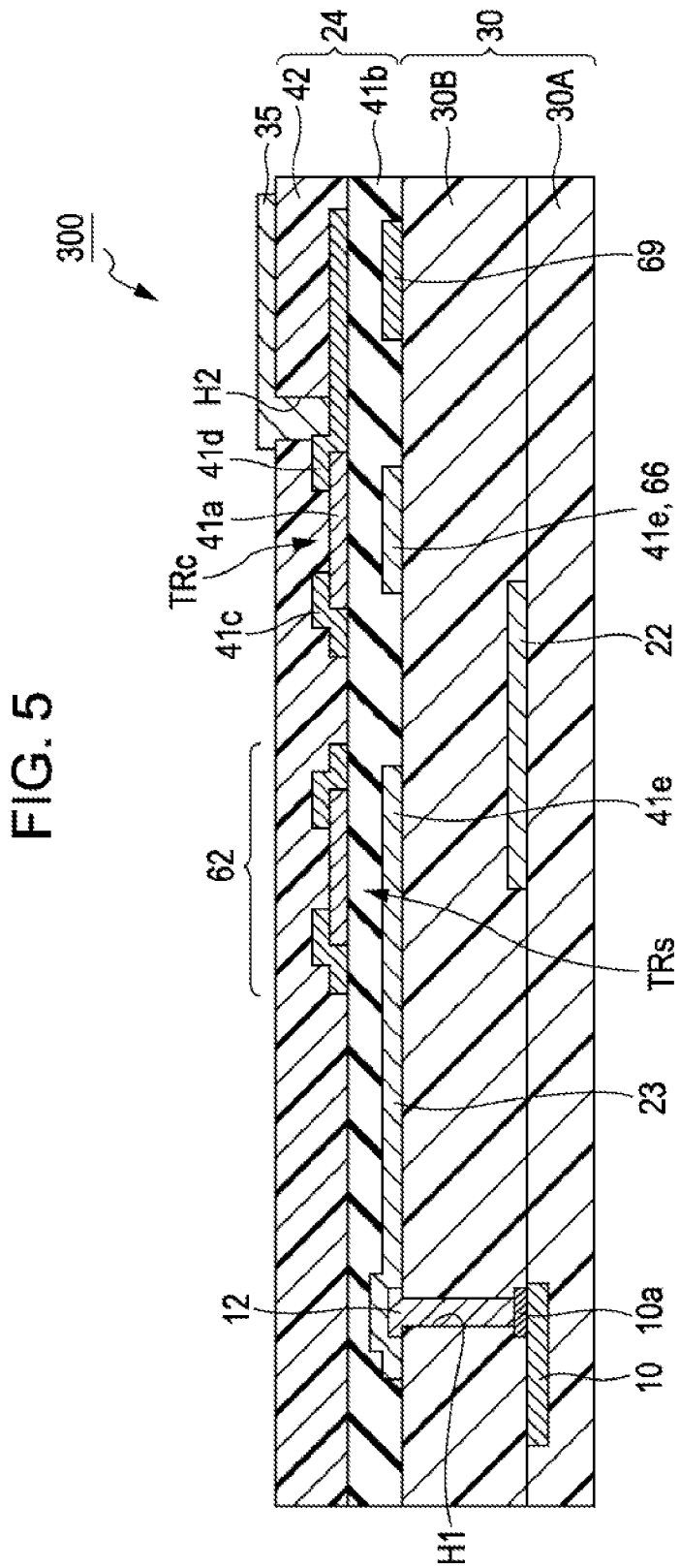
FIG. 5 is an enlarged cross-sectional view of a component substrate.

FIG. 5 is an enlarged cross-sectional view of the component substrate.

As shown in FIG. 5, in the first substrate 30 that configures the component substrate 300, one pair of base members 30A and 30B formed from polyimide are laminated, and a plurality of electronic components 10 is buried on the side of the base member 30A that is the lower layer side. Here, although the thickness of the base members 30A and 30B is 50 μm, it is not limited thereto.

On the surface of the base member 30A, an external connection terminal 10a of the electronic component 10 is exposed, and a connection wiring 22, which is formed from Cu having a thickness of 5 μm, that connects the electronic components 10 together is disposed. In addition, the base member 30B is laminated on the base member 30A so as to cover a plurality of the electronic components 10 (only one is shown in FIG. 5) and the connection wiring 22 that connects the external connection terminal 10a and the electronic components 10. On the base member 30B, a control transistor TRc disposed for each pixel 40, a scanning line driving circuit 61, a data line driving circuit 62, and a driving transistor TRs that configures a common power supply circuit 64 are disposed.

More specifically, on the surface of the base member 30B, each gate electrode 41e (scanning line 66) corresponding to the control transistor TRc and the driving transistor TRs, a holding capacitor line 69, and a connection wiring 23 that connects the above-described driving circuits 61, 62, and 64 and the electronic component 10 are formed. The connection wiring 23, the gate electrode 41e (scanning line 66), and the holding capacitor line 69 are formed from Cu having a thickness of 300 nm. Here, the connection wiring 23 and a contact hole H1 are connected to each other as the entire surface of the connection terminal 12, which is formed on the surface of the base member 30B, so as to have an area larger than the cross-section of the contact hole H1 is covered by the connection wiring 23. Here, the contact hole H1 is configured by burying a part (forming material) of the connection terminal 12 inside the base member 30B. Base on such a connection state, even in a case where the component substrate 300 is bent, the state of the connection between the connection wiring 23 and the electronic component 10 can be maintained well.

In addition, on the entire surface of the base member 30B, a gate insulating film 41b formed from polyimide having a thickness of 400 nm is disposed so as to cover the connection wiring 23, the gate electrode 41e (scanning line 66), and the holding capacitor line 69. On the gate insulating film 41b, a semiconductor layer 41a formed from pentacene having a thickness of 50 nm, which configures the control transistor TRc and the driving transistor TRs, is disposed, and a source electrode 41c and a drain electrode 41d having a thickness of 300 nm, which are formed from Cu pastes, are disposed so as to be seated on the peripheral edge thereof.

Furthermore, a protection film 42 having a thickness of 1 μm, which is formed from acryl, is disposed so as to cover the entire surface of the gate insulating film 41b is disposed, and a pixel electrode 35 formed from a carbon paste is formed on the surface thereof. This pixel electrode 35 is connected to the drain electrode 41d of the control transistor TRc disposed on the lower side through a contact hole H2 passing through the protection film 42 in the thickness direction thereof. The thickness of the protection film of the pixel electrode 35 is 0.2 μm.

The driving transistor TRs is formed in a manner similar to the control transistor TRc. Although a pixel electrode is not included in the driving transistor TRs, the pixel electrode may be used for a wiring between the driving transistors TRs.

As above, the component substrate 300 according to this embodiment is configured.

Here, the control transistor TRc and the driving transistor TRs are formed by repeating coating and sintering of a material. Generally, a silicon-based TFT or an oxide TFT is formed by using a plasma CVD method or a sputtering method. In such a method, a substrate is strongly charged. In this embodiment, since the control transistor TRc and the driving transistor TRs are formed on the first substrate 30 in which a plurality of the electronic components 10 is buried, by exposing the first substrate 30 to plasma, the electronic components 10 are electrostatically damaged. Particularly, since the external connection terminal 10a is exposed on the surface of the electronic component 10, static electricity penetrates into the inside through the external connection terminal 10a, whereby the electronic component 10 is damaged. Accordingly, it is preferable to form the TFT using a technique not using plasma.

As one of such a technique, there is a method in which the coating of a material and the sintering of the material are combined by using a printing method or an ink jet method or a method using a deposition method or a sol-gel method.

In addition, generally, it is known that the semiconductor material of an organic TFT, differently from an oxide TFT, absorbs light. Accordingly, it is preferable that the first substrate 30 is a non-transparent substrate. However, in principle, the TFT can be created by using plasma, and an amorphous silicon TFT, a low-temperature polysilicon TFT, or an oxide TFT such as a-IGZO may be created. As a TFT that is disposed on the first substrate 30, an organic TFT may be preferably used.

Furthermore, in this embodiment, although an example of the bottom-gate/top-contact is illustrated as the TFT structure, other configurations may be employed. For example, a bottom gate/bottom contact, a top gate/top contact, or a top gate/bottom contact may be employed.

Figure 37A:
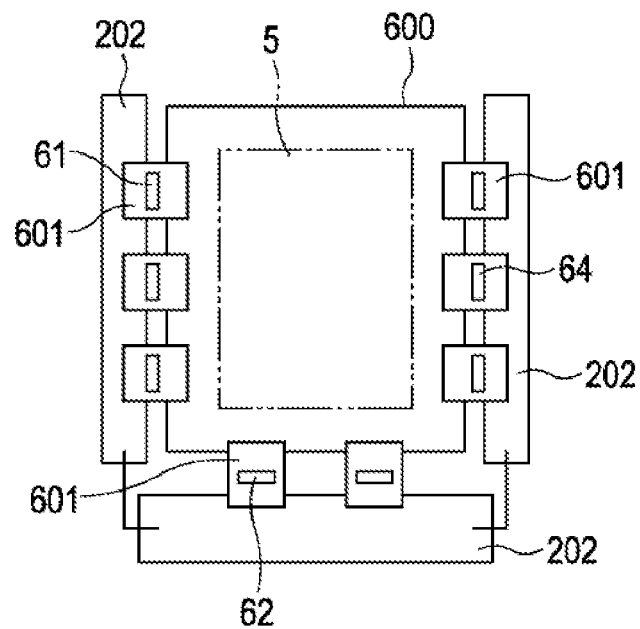
FIGS. 37A and 37B are plan views showing the configuration of a general electro-optical device (component substrate).
Figure 37B:
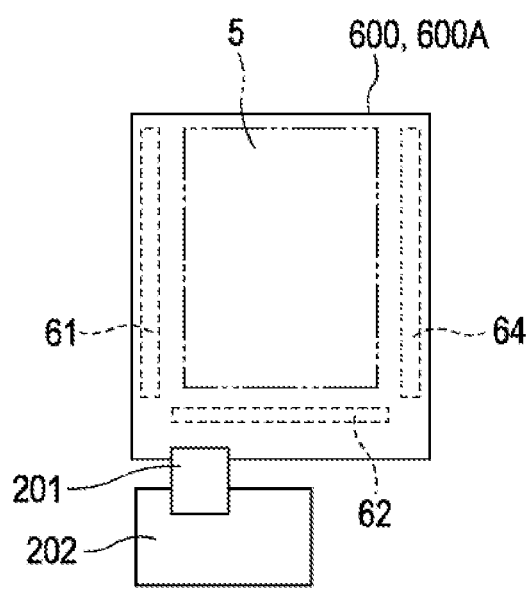

Here, it is particularly important that the electro-optical device 100 of which all four sides as shown in FIG. 1 have flexibility can be realized by burying a plurality of electronic components 10 inside the component substrate (first substrate 30) 300. In a method of forming TFTs on a component substrate that is formed from a single flexible base member, using the SUFTLA (registered trademark) technique, the EPLaR technique, or the like as general techniques, the plurality of electronic components needs to be separately arranged on the peripheral area of the display area as shown in FIGS. 37A and 37B by using another substrate. The plurality of electronic components is mounted on a rigid circuit substrate, and this circuit substrate is connected to the component substrate. Accordingly, only three sides out of four sides of the component substrate have flexibility.

Like the component substrate 300 according to this embodiment, by building a plurality of electronic components 10 inside the first substrate 30, all four sides of the component substrate 300 have flexibility, and, the electro-optical device 100 that has high flexibility can be realized for the first time. In addition, since a rigid circuit substrate that is generally used for mounting electronic components is not necessary, a light weight and a small thickness of the electro-optical device 100 can be realized.

In addition, the electro-optical device 100 having flexibility is used while it repeatedly bent or while it is fixed to the surface of an object in a bent state. At this time, the reliability of the connection between the electronic component 10 and the connection wiring is important. This can be realized by burying the electronic components 10 in the first substrate (thin-film transistor forming substrate) 30, which will be described later.

Furthermore, the electronic components 10 may be arranged so as to overlap the display unit 5 in the plan view. Accordingly, the size of the entire device can be decreased, and the display area can be enlarged in accordance with a decrease in the size of the frame.

Figure 6:
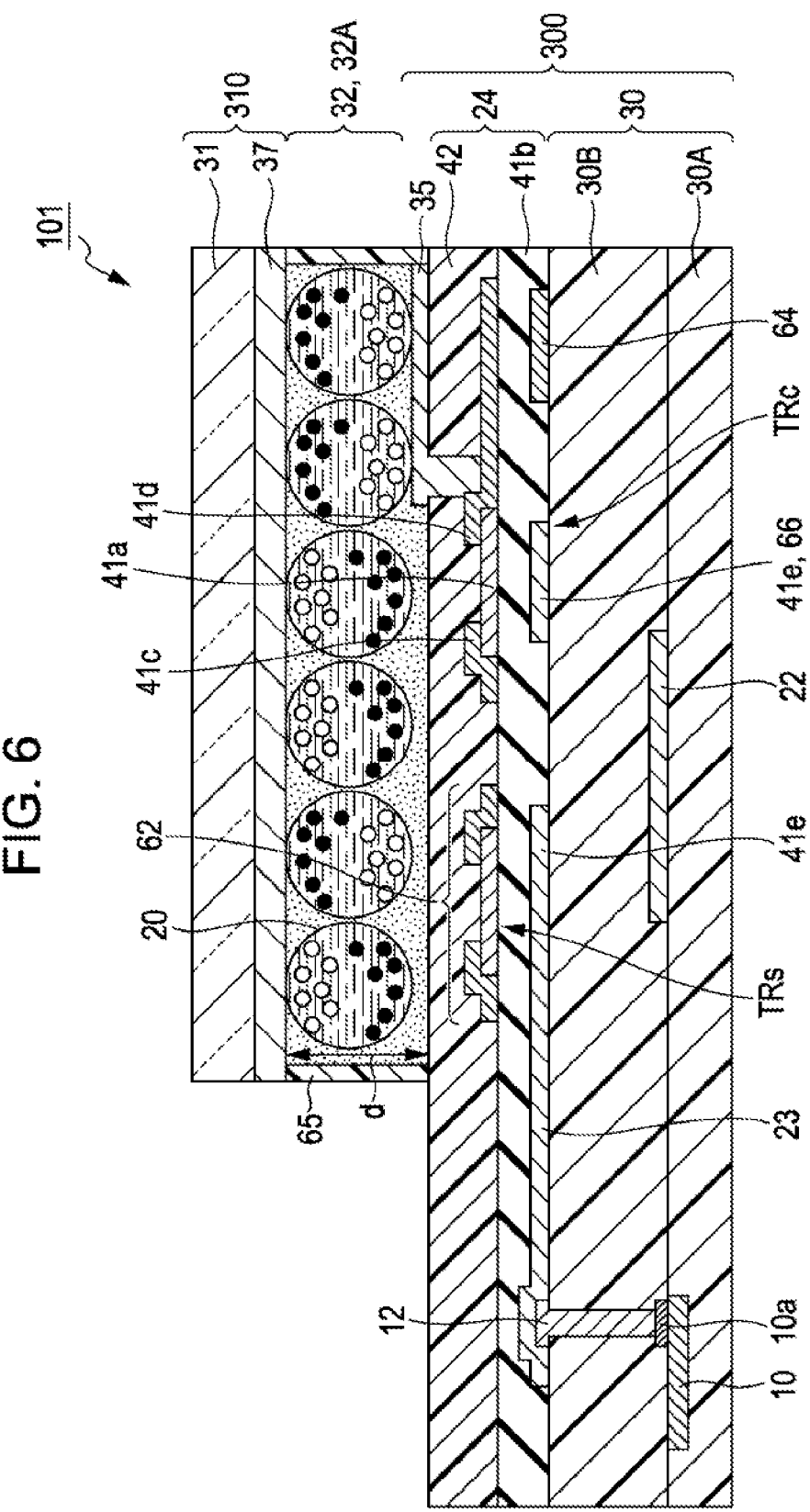
FIG. 6 is a partial cross-sectional view showing a schematic configuration of an electrophoretic display device as an embodiment of an electric apparatus including the above-described component substrate.

FIG. 6 is a partial cross-sectional view showing a schematic configuration of an electrophoretic display device as an electrophoretic display device including the above-described component substrate according to an embodiment of the invention.

As shown in FIG. 6, the electrophoretic display device (electric apparatus) 101 has a configuration in which an electrophoretic element 32A used as the electro-optical element (display element) 32 is interposed between the component substrate 300 and the opposing substrate 310. The periphery of the electro-optical element 32 is sealed by a sealing member 65 that is formed from acryl. The electro-optical element (electrophoretic element) 32 is formed by arranging a plurality of microcapsules 20. Thus, white particles and black particles that are maintained inside the microcapsules 20 and charged with different polarities move in accordance with a voltage applied between the pixel electrode 35 and the opposing electrode 37, whereby a display is performed. Here, as the electro-optical element (electrophoretic element) 32, an electrophoretic element 32A that uses a partition other than the microcapsule or does not use any partition or an electrophoretic element 32A that uses colored particles may be used. In addition, any other electro-optical element such as a liquid crystal or an electrochromic material may be used.

In this embodiment, a polyimide material having flexibility can be used as the material of the first substrate 30 and the second substrate 31 configuring the component substrate 300 and the opposing substrate 310. Since the second substrate 31 is a substrate that is disposed on a visible side, it needs to be transparent. Accordingly, a transparent polyimide material or any other transparent material is used as the material of the second substrate 31.

Generally, a material having flexibility is an organic material, and the organic material has a linear expansion coefficient having one order of magnitude higher than an inorganic material that is rigid and a heat transfer coefficient having one less digit than the inorganic material. Accordingly, when the component substrate generates heat, the heat can be easily collected, so that the substrate grows. Therefore, a bending state occurs in the electro-optical device. In addition, in this state, when the electro-optical device is used in a bent state, other defects occur. For example, there may be a defect in the connection between the electronic component and the connection wiring, formation of short circuits in various wirings, or the like.

Under a general configuration, for example, since an electro-optical device using electroluminescence generates a large amount of heat, a substrate that includes a thermal diffuser and is formed from an inorganic material is used. From this point, it is preferable that an electro-optical material generating a small amount of heat be used for the component substrate that has flexibility or has an inorganic material as its main body. A material that generates a small amount of heat is a material to which a current or a voltage is not applied as possibly as can when a display is performed. An electro-optical device using a material having a memory property is the most preferable, and when a voltage is applied thereto, a display can be maintained without applying a voltage thereto after that. More specifically, such a material is an electrophoretic material or an electrochromic material. An electro-optical device that is preferable next thereto is an electro-optical device that uses a material that is driven not by a current but by a voltage, and there are a liquid crystal material and electrowetting as examples of such a material.

On the other hand, the least preferable material is electroluminescence that is driven by a current.

In the case of a material that does not have a memory property, by arranging a memory function such as an SRAM in the IC for each pixel, a substantial memory property can be given.

In a case where a liquid crystal material is used, there are problems other than the above-described problems more than those in a case where the electrophoretic material (material having a memory property) is used. Generally, since a polarizing plate is used in a liquid crystal device, the brightness thereof decreases by half. In order to resolve this, a material such as a guest host liquid crystal, a PDLC (Polymer Dispersed Liquid Crystal) or PNLC (Polymer Network Liquid Crystal) that does not use a polarizing plate is preferable.

In addition, the material that can be used in the first embodiment is not limited thereto.

As the material that is used for the first substrate 30 and the second substrate 31 that configure the component substrate 300, polyester having flexibility or any other organic or inorganic material may be used. In addition, paper phenol, paper epoxy, glass composite, glass expoxy, thin glass, Teflon (registered trademark), or ceramics, a composite material thereof, or any other inorganic or organic material may be used as long as it does not have flexibility.

For example, a configuration may be employed in which the outermost base member such as the base member 30A is formed from a molding material such as silicon.

In addition, as the material used for the component substrate 300 or the opposing substrate 310, a material having elasticity may be used. In such a case, flexibility including elasticity can be realized. For example, the material may be a soft inorganic material such as acryl or a non-woven fabric, a woven fabric, or rubber that is coated therewith. In a case where the material has elasticity, the electro-optical device can be disposed so as to be affixed also on a material such as a cloth of clothing that has large deformation or a complicated surface shape without any gap, and the peel-off thereof can be reduced when it is used in a deformed manner.

Furthermore, the number of the base members configuring the first substrate 30 is not limited to the description presented above.

In addition, the material used for the TFT is not limited to that described above.

Furthermore, as a material used for the pixel electrode 35, the opposing electrode 37, the scanning line 66, the data line 68, the connection wirings 22 and 23, or the like, a paste of metal other than Cu, metal, a conductive material such as carbon nanotubes, an inorganic conductive material, an organic conductive material, a transparent electrode, or a conductive paste may be used.

Figure 7:
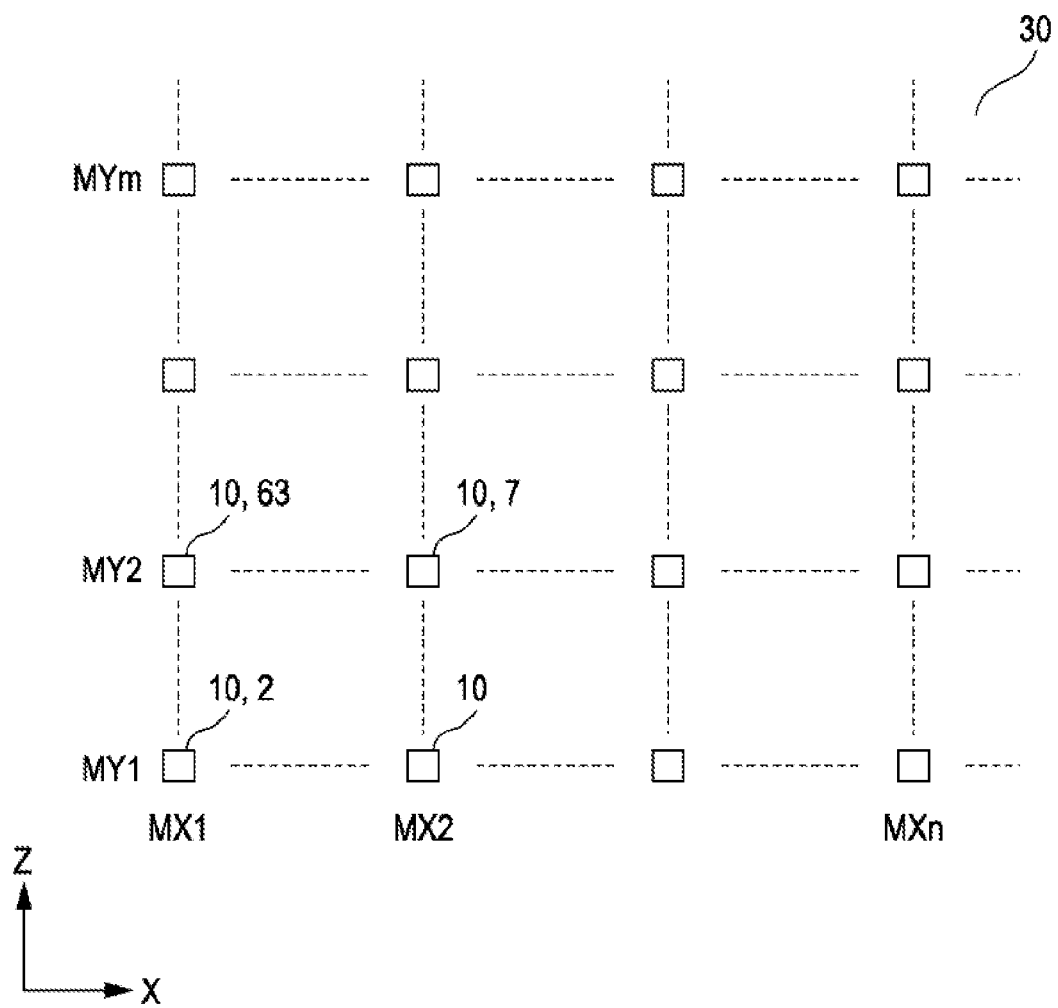
FIG. 7 is a conceptual diagram showing the size of electronic components for acquiring flexibility of an electro-optical device and an example of the arrangement thereof.

FIG. 7 is a conceptual diagram showing the size of electronic components (ICs) for acquiring flexibility of an electro-optical device and an example of the arrangement thereof.

The degree of bending of the electro-optical device 100 (electrophoretic display device 101) relates to the degree of flexibility of the material of the component substrate 300 and the size and the arrangement gap of a plurality of electronic components (ICs) 10 buried inside the first substrate 30.

As shown in FIG. 7, a plurality of the electronic components (IC) 10 is buried inside the first substrate 30 that configures the component substrate 300, n electronic components (ICs) 10 of MX1, MX2, . . . , MXn are arranged so as to be aligned in the X direction, and n electronic components 10 of MY1, MY2, . . . , MYn are arranged so as to be aligned in the Y direction. Here, the arrangement gap of the electronic components (ICs) 10 adjacent to each other in the X direction and the Y direction is set to be equal to or more than five times the length of one side of each electronic component (IC) 10 in a direction binding the electronic components 10 adjacent to each other. More specifically, since one side of the electronic component (IC) 10 is 2 mm, a distance between the electronic components (IC) 10 adjacent to each other is equal to or longer than 10 mm.

For example, a distance between the controller 63 (10) shown in FIG. 4 and a memory 7 (10) that are adjacent to each other in the X direction and a distance between the controller 63 (10) and a battery cell 2 (10) that are adjacent to each other in the Y direction are respectively equal to or longer than five times of the size of a longer side out of sides that are horizontal to the direction, in which the components adjacent to each other are adjacent to each other. The size of the battery cell used here is assumed to be small as 5 mm×5 mm.

By arranging the plurality of electronic components (IC) 10 at such a gap, the degree of flexibility that is almost the same as the original degree of flexibility of the material (polyimide material) composing the first substrate 30 can be given to the component substrate 300. In order to provide the component substrate 300 the degree of flexibility that is the same as that of the material of the first substrate 30, the arrangement gap between the electronic components (IC) 10 needs to be set to be equal to or longer than at least three times of one side of the electronic component (IC) 10. Also in this case, the arrangement gap is set to be equal to or longer than three times the length of a longer side of the sides of the electronic component (IC) 10 that are parallel to the direction binding the electronic components (IC) 10 adjacent to each other.

In addition, as a reference, by setting the arrangement gap of the electronic components (IC) 10 to be equal to or longer than the length of one side of the electronic component (IC) 10, the component substrate 300 can be gently bent, for example, like a desk pad as stationery. In this state, since the electronic components (IC) 10 are not bent, not a small radius of curvature can be given, but flexibility can be given to the component substrate 300.

In addition, when the sides of the electronic components (IC) 10 are arranged so as to be tilted from the direction binding the electronic components (IC) 10 adjacent to each other at the minimal distance, a distance that is equal to or longer than one time or three times the maximum length of the sides of the components adjacent to each other is arranged.

Furthermore, the length of one side of the electronic component (IC) 10 is equal to or less than 5 mm, is preferably equal to or less than 3 mm, and is more preferably equal to or less than 1 mm. When the component substrate 300 is bent, a small electronic component (IC) 10 is difficult to break, and the robustness thereof can be improved. In addition, stress applied to the electronic components (IC) 10 when the component substrate 300 is bent is low. Accordingly, the electronic component (IC) 10 is prevented from being broken, and the state of the connection between the first substrate 30 and the electronic component (IC) 10 or the state of the connection between connection terminals (not shown) of the electronic component (IC) 10 and connection wirings (not shown) that connect the connection terminals can be secured.

In addition, there is no limitation described above on a large electronic component of a square of several cm. It is preferable that flexibility is given to a component larger than 5 mm×5 mm or a component larger than 1 cm×1 cm.

Here, the built-in position of the electronic component (IC) 10 inside the component substrate 300, that is, the position of the electronic component (IC) 10 in the thickness direction of the component substrate 300 is not particularly defined. All the electronic components (IC) 10 may be arranged on the side of the base member 30A that configures the first substrate 30, all the electronic components (IC) 10 may be arranged on the side of the base member 30B, or a plurality of electronic components (IC) 10 may be arranged in each of the base members 30A and 30B. In addition, the number of the base members that configure the first substrate 30 is not limited to two, and all the electronic components (ICs) 10 may be disposed in different base members.

In a case where the electronic component 10 is thicker than the base member of one layer, it may be disposed in a plurality of consecutive base members.

It may be configured such that the component substrate 300 has base members of three or more layers, and the electronic components (ICs) are disposed so as to be laminated at the same place in the plan view, in other words, the electronic components are laminated with the base members interposed therebetween in the cross-sectional view.

In addition, although it is known that, by forming the electronic component (IC) 10, for example, to have a thickness of 20 µm or less, flexibility that is in the same level as the flexibility of the component substrate 300 is acquired. However, even at that time, the electronic component (IC) 10 has elasticity more or less, thereby degrading flexibility. Accordingly, it is preferable to use the above-described condition.

Furthermore, in the description presented above, although the electronic components (ICs) 10 used for driving display elements has been described as an example, other rigid electronic components 10 such as various ICs (other electronic components (ICs) 10), capacitors, resistors, switches, or inductors may be used.

In addition, according to the above-described method, the reliability of the connection between the electronic component 10 and the connection wiring 22 is improved. The reason for this is that the entire electronic component 10 is wrapped by maintaining the electronic component 10 in the first substrate 30, whereby the connection portion is difficult to peel off when it is bent. Furthermore, by arranging a distance between the electronic components 10 as shown in FIG. 7, the stress applied to the electronic components 10 at the time of bending thereof is low.

In addition, the electronic components 10 are prevented from being fallen.

Second Embodiment

Figure 8:
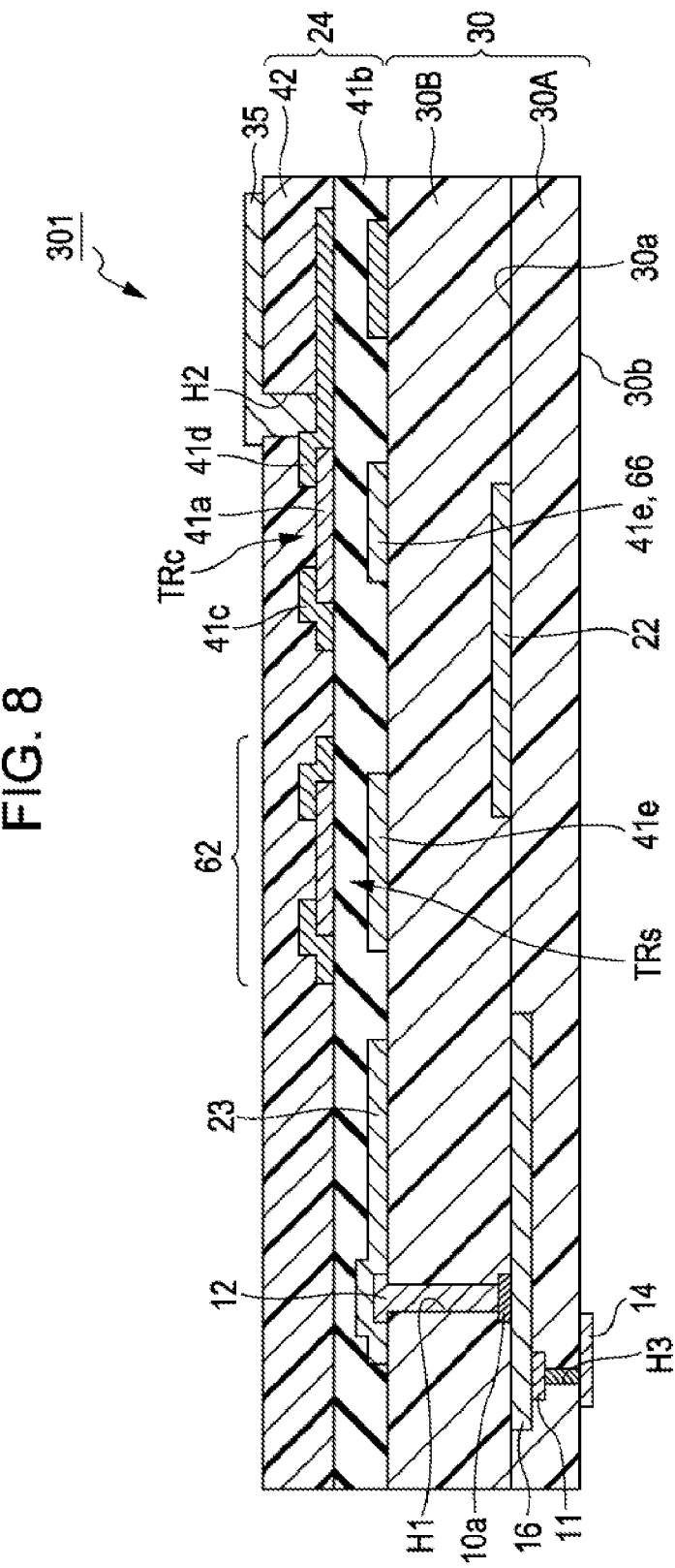
FIG. 8 is a cross-sectional view showing a schematic configuration of a component substrate, which configures an electro-optical device, according to a second embodiment.

FIG. 8 is a cross-sectional view showing a schematic configuration of a component substrate, which configures an electro-optical device, according to a second embodiment.

As shown in FIG. 8, the second embodiment is different from the previous embodiment in that a flexible sheet-type battery cell (electronic component) 16 as a power supply unit is buried inside the first substrate 30 (component substrate 301).

The sheet-type battery cell 16 is buried on the side of the surface 30a (a face disposed on the base member 30B side) of a base member 30A, and the plane direction of the surface of the sheet-type battery cell 16 coincides with that of the surface 30a of the base member 30A. On the rear face side of the sheet-type battery cell 16, an external connection terminal 11 is disposed. An external connection terminal 14 disposed on the rear face 30b of the base member 30A is connected to the external connection terminal 11 through a contact hole H3 that passes through the base member 30A in the thickness direction thereof. The external connection electrode 14 is connected to an external charging device, thereby charging the sheet-type battery cell 16. Since the external connection terminal 14 is connected in the state of protruding from the rear face 30b of the first substrate 30, it is preferable to use a material such as stainless steel that has superior abrasion resistance other than Cu. Although a secondary battery is cell is used as the sheet-type battery cell 16, a battery cell using an organic material such as a polymer or a battery cell using an inorganic material may be used.

Here, although the external connection electrode 14 is disposed on the rear face side of the sheet-type battery cell 16, it may be disposed on the surface side of the component substrate 301. In such a case, a connection terminal for a connection with an external electronic device such as a USB that is disposed in a PC or the like may be disposed.

Third Embodiment

Figure 9:
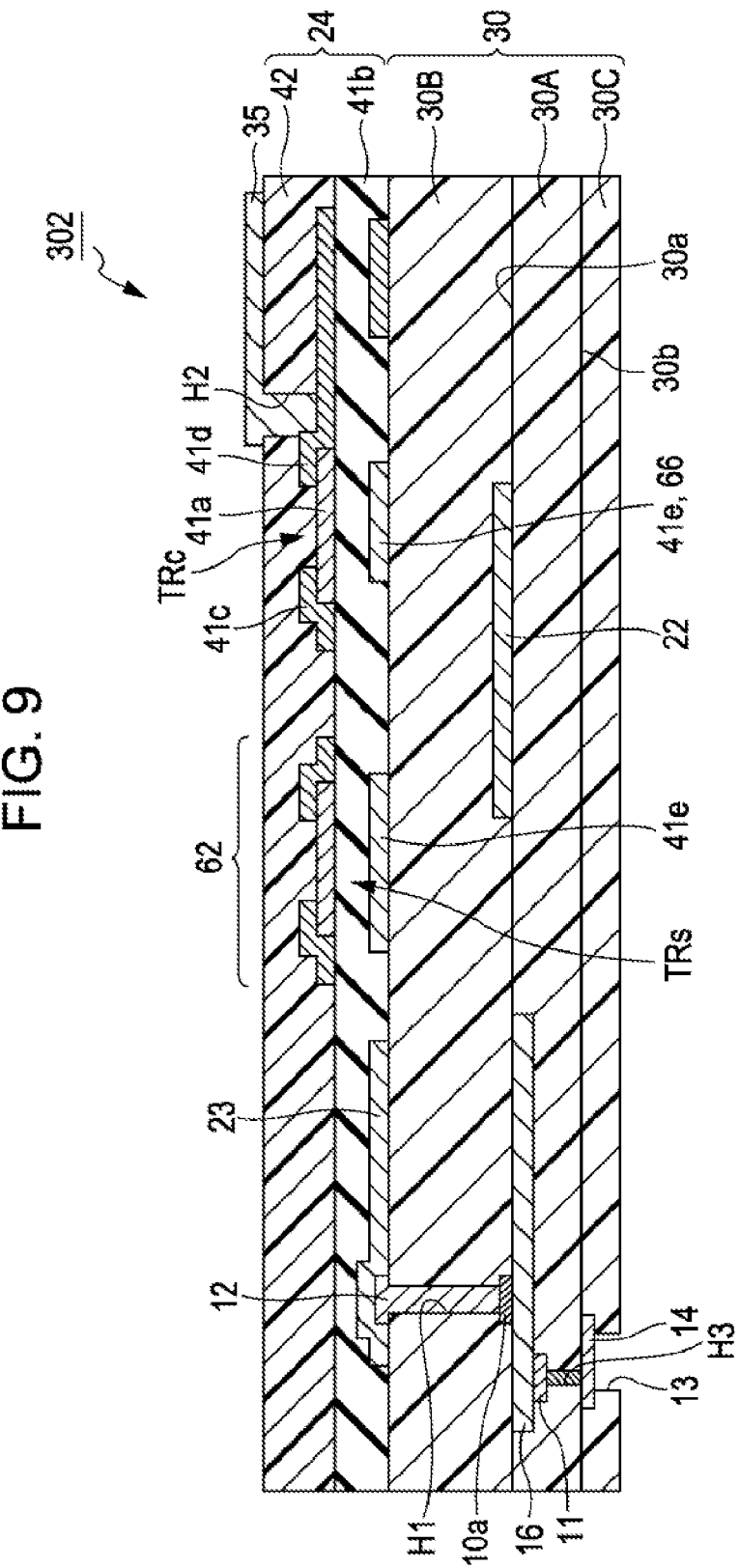
FIG. 9 is a cross-sectional view showing the schematic configuration of a component substrate, which configures an electro-optical device, according to a third embodiment.

FIG. 9 is a schematic cross-sectional view showing the configuration of a component substrate, which configures an electro-optical device, according to a third embodiment.

As shown in FIG. 9, the component substrate 302 according to the third embodiment is different from that according to the previous embodiment in that an external connection electrode 14 is configured so as to be buried inside a first substrate 30.

The first substrate 30 configuring the component substrate 302 is configured by three base members 30A to 30C, and the base member 30C is disposed on the side of a face (rear face 30b) located opposite to the base member 30B side of the base member 30A. An external connection terminal 14 disposed on the rear face 30b of the base member 30A is in the state of being buried inside the base member 30C, and a state is formed in which a part thereof is exposed from a through hole 13 disposed in the base member 30C. Since a peripheral edge portion of the external connection electrode 14 is covered with the base member 30C, a configuration is formed in which the external connection electrode 14 is prevented from being peeled off from the rear face 30b of the base member 30A. A different burial structure of the external connection electrode 14 may be employed.

Although the external connection electrode 14 is disposed on the outer side of a display unit 5 as shown in FIG. 9, it may be disposed inside the display unit 5.

Fourth Embodiment

Figure 10:
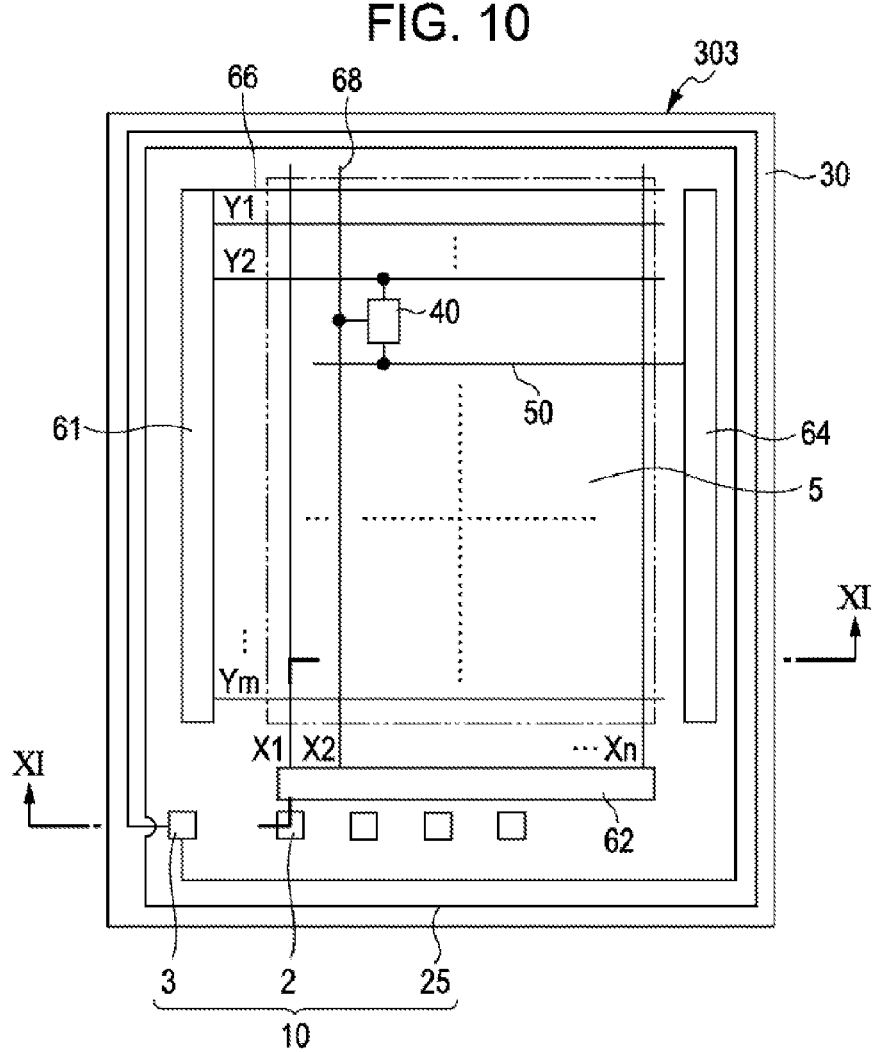
FIG. 10 is a plan view showing the configuration of a component substrate, which configures an electro-optical device, according to a fourth embodiment.
Figure 11:
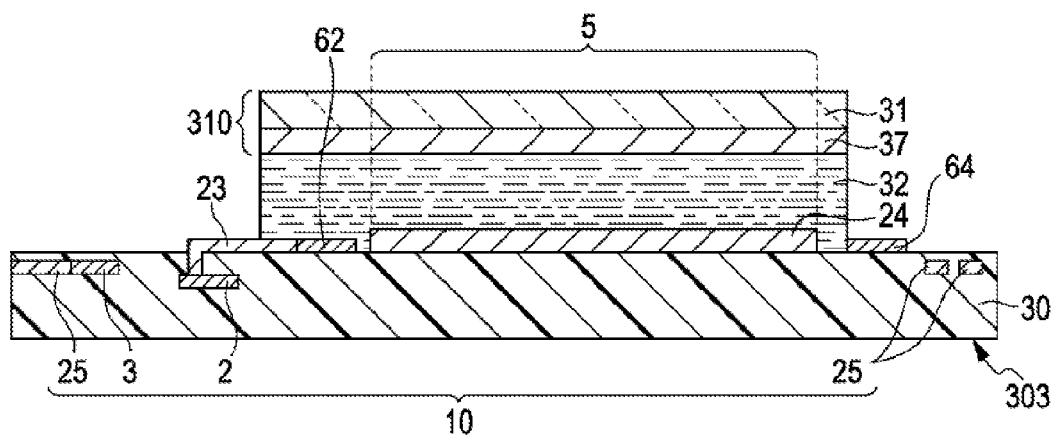
FIG. 11 is a cross-sectional view showing a schematic configuration of the electro-optical device according to the fourth embodiment.

FIG. 10 is a plan view showing the configuration of a component substrate, which configures an electro-optical device, according to a fourth embodiment. FIG. 11 is a cross-sectional view showing a schematic configuration of the electro-optical device according to the fourth embodiment.

This embodiment is different from the previous embodiment in that a loop antenna (electronic component) 25, which is a communication unit used for external communication, is configured by a coil circulating along each side of a component substrate 303.

The coil that configures the loop antenna 25 is formed by using Cu that is the same material as those of various wirings formed on or inside a first substrate 30 simultaneously with the wirings and is formed in the same layer as one of the various wirings. In a peripheral edge area of the first substrate 30 that is the periphery of the display unit 5, the loop antenna 25 is configured by circulating a wiring along the sides of the first substrate 30 in a coil shape. This loop antenna 25 is connected to a communication circuit 3 that serves as a communication control unit.

Here, the position of the loop antenna 25 in the component substrate 303 is not limited thereto. For example, the antenna may be configured by forming wirings in different layers (between the base members) of the first substrate 30 having a multi-layer structure and forming connections of the wirings between multiple layers. In such a case, so-called an RF-ID (Radio Frequency Identification: identification of a solid body according to an electric wave) operation, a wireless communication with an external network, or non-contacting power supply can be performed. In addition, the loop antenna 25 may be arranged so as to overlap the display unit 5 in the plan view.

In addition, although a structure has been shown in which the loop antenna 25 is formed on the periphery (non-display area) of the display unit 5, the loop antenna 25 may be disposed such that at least a part thereof is present inside the display unit 5 or on the lower side of the scanning line driving circuit 61, the data line driving circuit 62, the common power supply circuit 64, and the like. Furthermore, the shape of the loop antenna 25 may be not a coil shape but a linear shape, a curve shaped, or any other shape.

Fifth Embodiment

Figure 12:
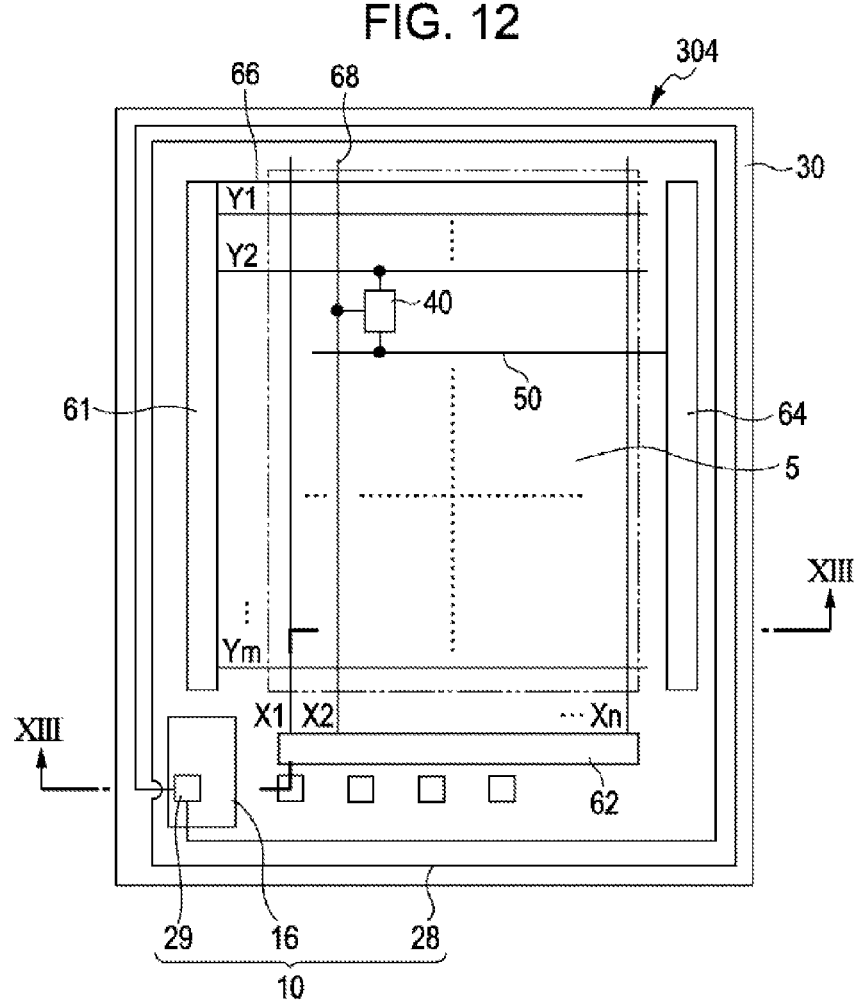
FIG. 12 is a plan view showing the configuration of a component substrate, which configures an electro-optical device, according to a fifth embodiment.
Figure 13:
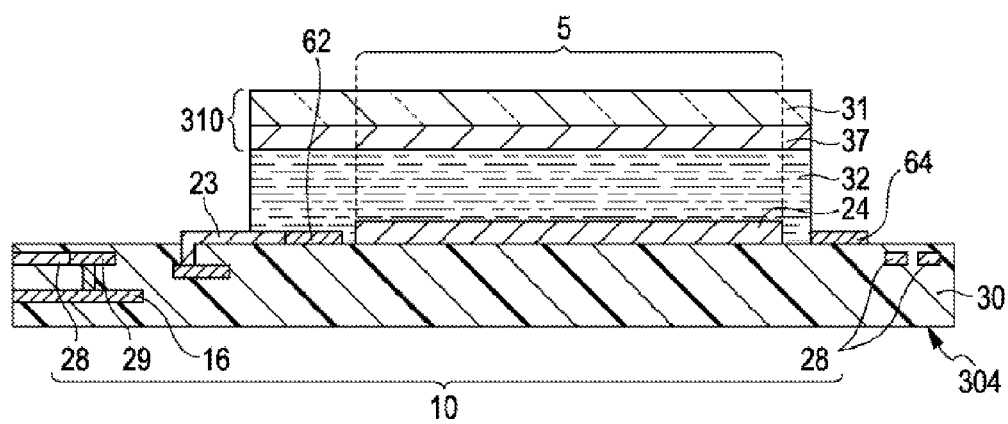
FIG. 13 is a cross-sectional view showing a schematic configuration of the electro-optical device according to the fifth embodiment.

FIG. 12 is a plan view showing the configuration of a component substrate, which configures an electro-optical device, according to a fifth embodiment. FIG. 13 is a cross-sectional view showing a schematic configuration of the electro-optical device according to the fifth embodiment.

As shown in FIGS. 12 and 13, according to this embodiment, a sheet-type battery cell (electronic component) 16 is configured so as to be charged by using an electromagnetic induction-type power supply unit. In the component substrate 304, a non-contact charging coil 28, which is formed so as to circulate the peripheral edge thereof, as the power supply unit is buried. This coil 28 is connected to a power supply circuit 29 as a power control unit, and the power supply circuit 29 is connected to the sheet-type battery cell 16 as a secondary battery cell.

In this embodiment, although the coil 28 used for electromagnetic induction as the power supply unit is buried inside the first substrate 30, a configuration may be employed in which a power supply unit and a power supply control unit corresponding to an electric-wave reception type or a resonance type are buried. The coil of this embodiment may be formed and arranged similarly to the antenna of the fourth embodiment.

Sixth Embodiment

Figure 14:
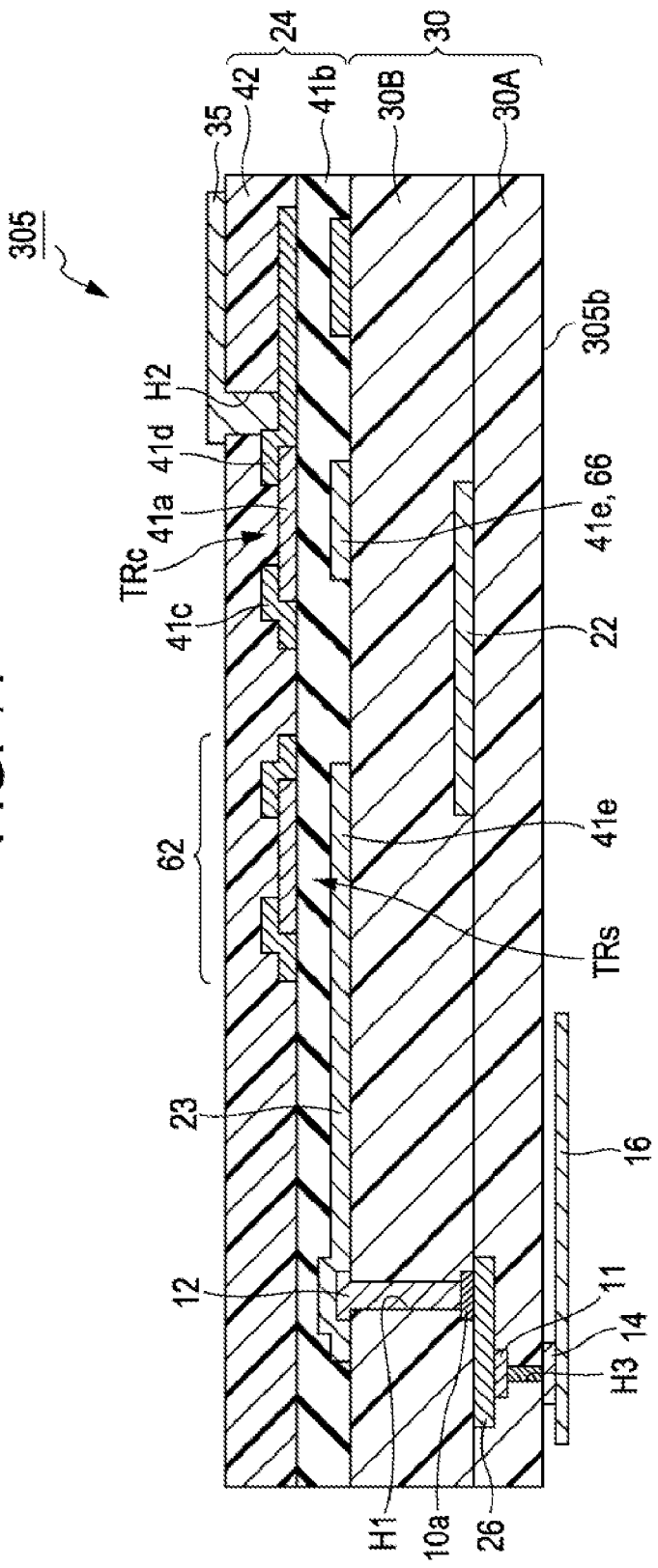
FIG. 14 is a cross-sectional view showing a schematic configuration of a component substrate, which configures an electro-optical device, according to a sixth embodiment.

FIG. 14 is a cross-sectional view showing a schematic configuration of a component substrate, which configures an electro-optical device, according to a sixth embodiment.

As shown in FIG. 14, in this embodiment, a sheet-type battery cell 16 is externally attached to the rear face 305b side of a component substrate 305. This sheet-type battery cell 16 is connected to a charging control circuit 26 that is buried inside a component substrate 305 (base member 30A) through an external connection terminal 14 formed on the rear face 305b (the rear face of the base member 30A) of the component substrate 300 and an external connection terminal 11 connected to the external connection electrode 14 through a contact hole H3.

In this embodiment, since the sheet-type battery cell 16 is arranged so as to overlap the charging control circuit 26 in the plan view, the miniaturization of the device can be realized.

Seventh Embodiment

Figure 15:
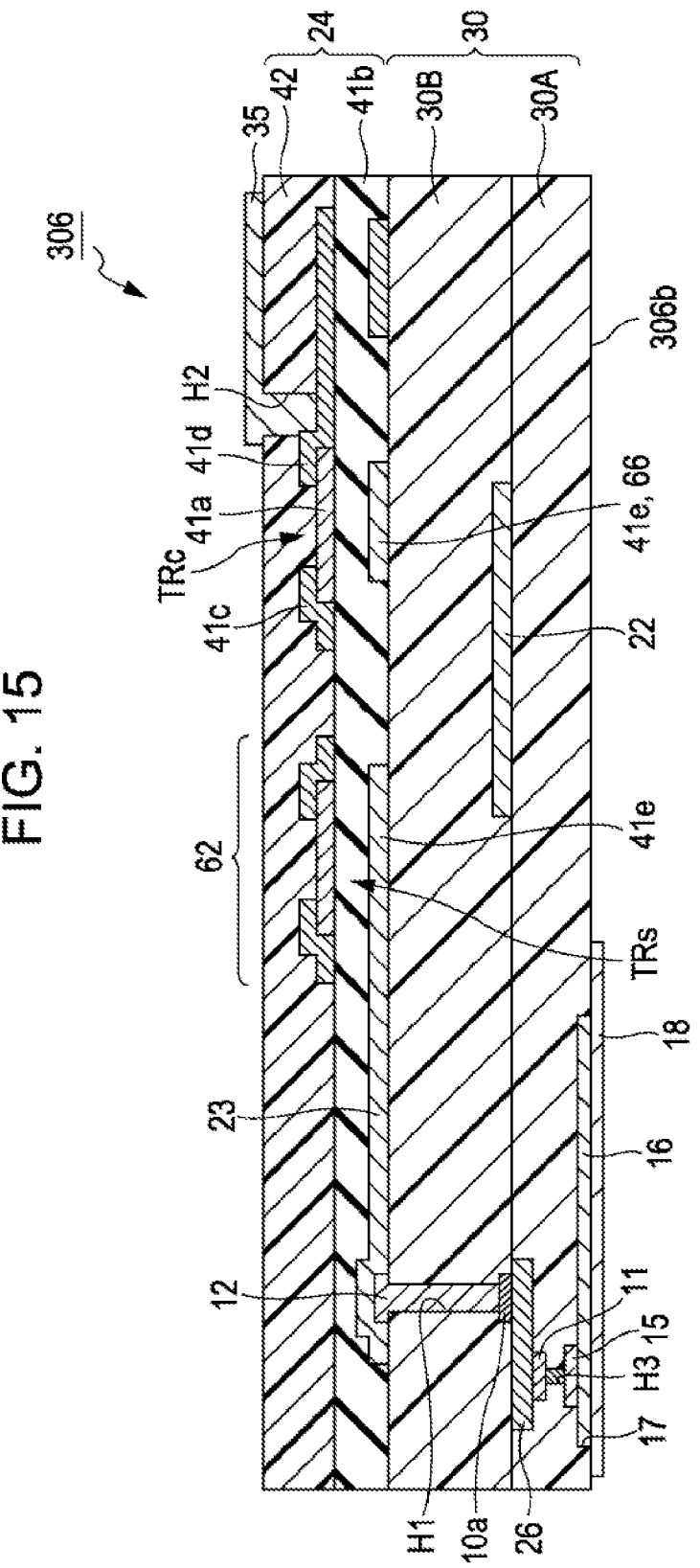
FIG. 15 is a cross-sectional view showing a schematic configuration of a component substrate, which configures an electro-optical device, according to a seventh embodiment.

FIG. 15 is a cross-sectional view showing a schematic configuration of a component substrate, which configures an electro-optical device, according to a seventh embodiment.

In the configuration of the sixth embodiment described above, in order to implement the configuration in which the sheet-type battery cell 16 is connected to the rear face 306b side of the component substrate 306, the component substrate 306 externally protrudes by a length corresponding to the thickness of the sheet-type battery cell 16, whereby the thickness of the device is increased. In order to prevent this, in this embodiment, as shown in FIG. 15, a battery cell housing concave portion (concave portion) 17 (spot facing) that can house a sheet-type battery cell 16 may be disposed in the rear face 306b (the rear face 30b of the base member 30A) of the component substrate 306. By housing the sheet-type battery cell 16 inside the battery cell concave portion 17, an increase in the thickness due to the external protrusion of the sheet-type battery cell 16 to the outside of the component substrate 306 can be prevented.

In addition, by arranging a lid portion 18 that covers the battery cell housing concave portion 17, the sheet-type battery cell 16 housed inside the battery cell housing concave portion 17 can be prevented from being fallen. In addition, the entire sheet-type battery cell 16 is fixed to the first substrate 30 by burying the sheet-type battery cell 16 inside the base member 30A. Accordingly, the state of the connection between an external connection electrode 15 located on the sheet-type battery cell 16 side and an external connection terminal 11 located on the charging control circuit 26 side is stable, whereby reliability is improved. Furthermore, the sheet-type battery cell 16 of which the life cycle is shortened can be easily replaced.

In addition, a concave portion used for burying the lid portion 18 may be disposed such that the surface of the lid portion 18 coincides with the rear face 306b (the rear face 30b of the base member 30A) of the component substrate 306. In such a case, a configuration is formed in which the lid portion 18 does not protrude from the rear face 306b of the component substrate 306. Furthermore, the component to be buried is not limited to the sheet-type battery cell 16, and it may be configured such that a concave portion used for burying a component protruding toward the outside of the component substrate 306 is arranged in the base member, and the concave portion is sealed by the lid portion.

Eighth Embodiment

Figure 16:
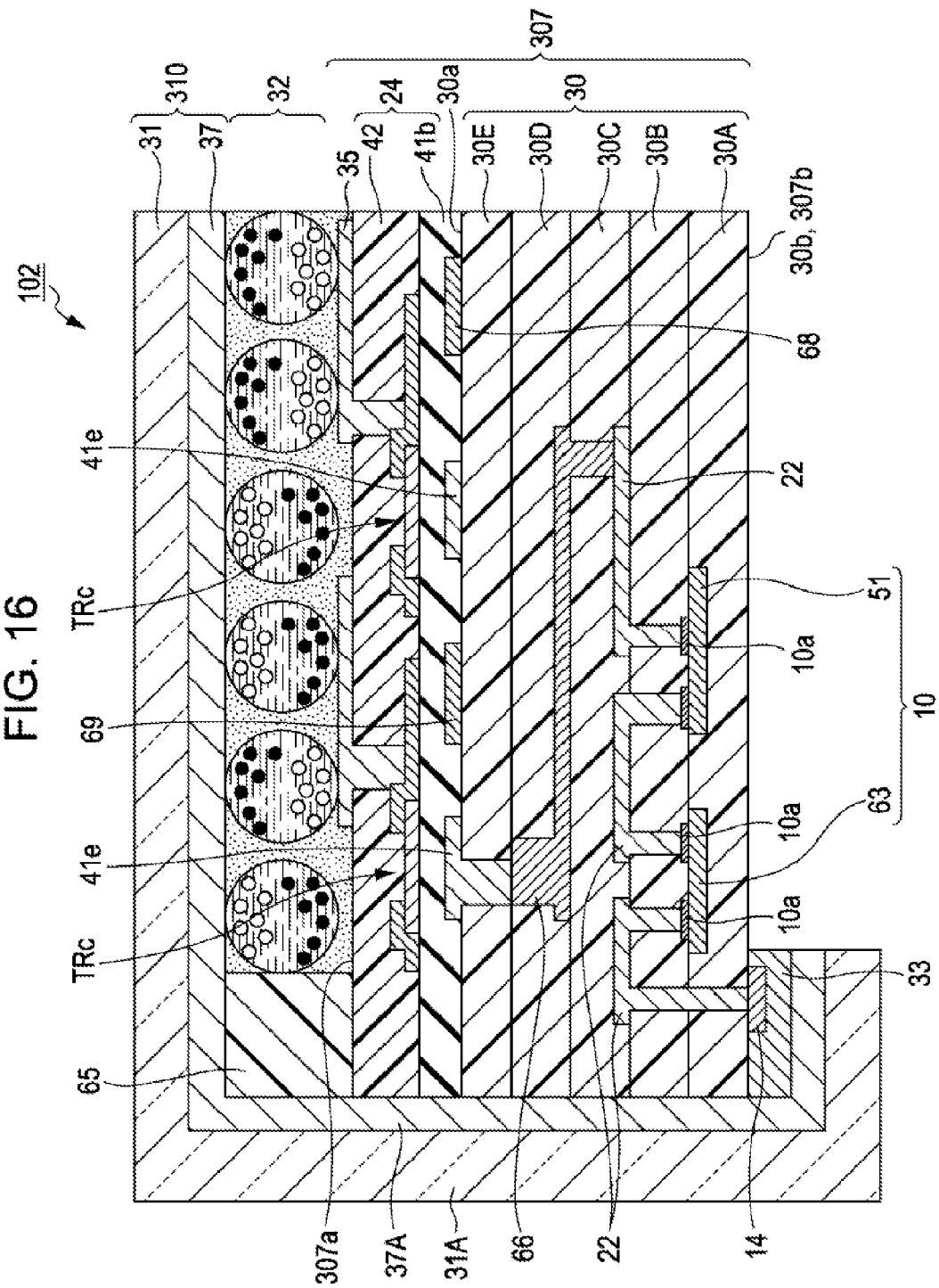
FIG. 16 is a partial cross-sectional view showing a schematic configuration of an electrophoretic display device using a component substrate according to an eighth embodiment.

FIG. 16 is a partial cross-sectional view showing a schematic configuration of an electrophoretic display device using a component substrate according to an eighth embodiment.

An electrophoretic display device 102 according to this embodiment is configured such that at least a part of the peripheral edge portion of an opposing substrate 310 arranged so as to face a component substrate 307 through an electrophoretic element (electro-optical element 32) goes around to the rear face 307b side of the component substrate 307, which is different from that according to the previous embodiment.

As shown in FIG. 16, a first substrate 30 that configures the component substrate 307 according to this embodiment is acquired by laminating five base members 30A to 30E. A scanning line 66, a data line 68 (not shown), a holding capacitor line 69, a plurality of electronic components 10, and a connection wiring 22 that are buried inside the first substrate 30 are buried in different layers, and, by arranging these inside a display unit 5 so as to overlap each other in the plan view, a decrease in the thickness of the frame and the miniaturization of the device can be implemented.

On the surface 30a of the first substrate 30, a plurality of the data lines 68 is arranged in a stripe pattern, and the gate electrode 41e of a control transistor TRc is disposed for each pixel 40. The scanning line 66 buried inside the first substrate 30 is connected to the gate electrode 41e, and a driving driver 51 (10) disposed on the further lower side is connected to the scanning line 66. The driving driver 51 controls the selection timing of the scanning line 66, the magnitude of an applied voltage, and the like. In addition, a driving driver 52 (not shown) used for driving the data line 68 is connected to the data line 68. The driving drivers 51 and 52 are connected to a controller 63. The other external connection terminal 10a of the controller 63 is connected to an external connection terminal 14, and a voltage to be applied to an opposing electrode 37 is output to this terminal from the controller 63.

Actually, this external connection electrode 14 is arranged at a position overlapping the display unit 5 in the plan view.

In addition, the opposing substrate 310, similarly to that of the previous embodiment, includes a second substrate 31 having the same degree of flexibility as PET, and an opposing electrode 37 formed from carbon nanotubes is formed on one face side of the second substrate 31. In this embodiment, at least a part of the peripheral edge portions of the second substrate 31 and the opposing electrode 37 extends to the rear face 307b (the rear face 30b of the first substrate 30) side of the component substrate 307.

Here, an extended portion 37A of the opposing electrode 37 and an extended portion 31A of the second substrate 31 face at least an external connection terminal 11 disposed on a rear face 300b of the component substrate 300. In addition, the extended portions and the external connection terminal 11 are electrically connected to each other through a vertical conduction portion 33 formed from a conductive material that is arranged between the external connection terminal 11 and the extended portion 37A of the opposing electrode 37. Accordingly, a configuration is formed in which a predetermined electric potential is input to the opposing electrode 37.

Here, the configuration of the component substrate 307 is not limited to that described above, and the configuration of another embodiment may be employed.

In addition, all four sides of the opposing substrate 310 (the second substrate 31 and the opposing electrode 37) may be configured to extend to the rear face 307b side of the component substrate 307 or to partially extend thereto.

Furthermore, although a silver paste is used as the conduction portion 33, however, the conduction portion 33 is not limited thereto. In addition, a battery cell other than the IC or any other power supply may be used as a voltage applying unit.

In a case where the vertical conduction portion 33 is formed on the surface 307a side of the component substrate 307, a formation area used for forming the vertical conduction portion 33 is required. Accordingly, it is necessary to decrease a part of the display area or broaden the frame.

However, according to the configuration of this embodiment, since the formation area used for forming the vertical conduction portion 33 on the component substrate 307 is not necessary, a large display area can be secured, and a thin frame can be acquired.

FIGS. 17A to 17D are plan views showing examples of the arrangement of vertical conduction portions disposed on the rear face side of the component substrate.

For example, as shown in FIG. 17A, two longer sides 310c of the opposing substrate that face the opposing substrate 310 may be disposed so as to extend to the rear face 307b side of the component substrate 307. In such a case, between extended portions 31A (37A) and the component substrate 307, a plurality of the conduction portions 33 is arranged in a linear shape. Alternatively, as shown in FIG. 17B, between the extended portions 31A (37A) and the component substrate 307, the vertical conduction portions 33 each having a linear shape that grows along the longer side of the component substrate 307 may be disposed between extended portions 31A (37A) and the component substrate 307.

Furthermore, as shown in FIG. 17C, it may be configured such that all four sides of the opposing substrate 310 are disposed so as to extend to the rear face 307b side of the component substrate 307, and a plurality of vertical conduction portions 33 is disposed between four extended portions 31A (37A) and the component substrate 300. The plurality of vertical conduction portions 33 is arranged along the sides of the component substrate 307 in the peripheral edge portion thereof.

In addition, as shown in FIG. 17D, parts of two longer sides 310c of the opposing substrate 310 that face each other may be disposed so as to extend to the rear face 307b side of the component substrate 307. Here, two extended portions 31A (37A) are disposed in each longer side 310c of the opposing substrate 310, and vertical conduction portions 33 are arranged between the four extended portions 31A (37A) and the component substrate 307.

Furthermore, the configuration in which a part of the opposing substrate 310 is disposed so as to extend to the rear face 307b side of the component substrate 307, and the vertical conduction portion 33 is arranged between the extended portion 31A (37A) and the component substrate 307 is not limited thereto.

Ninth Embodiment

Figure 18:
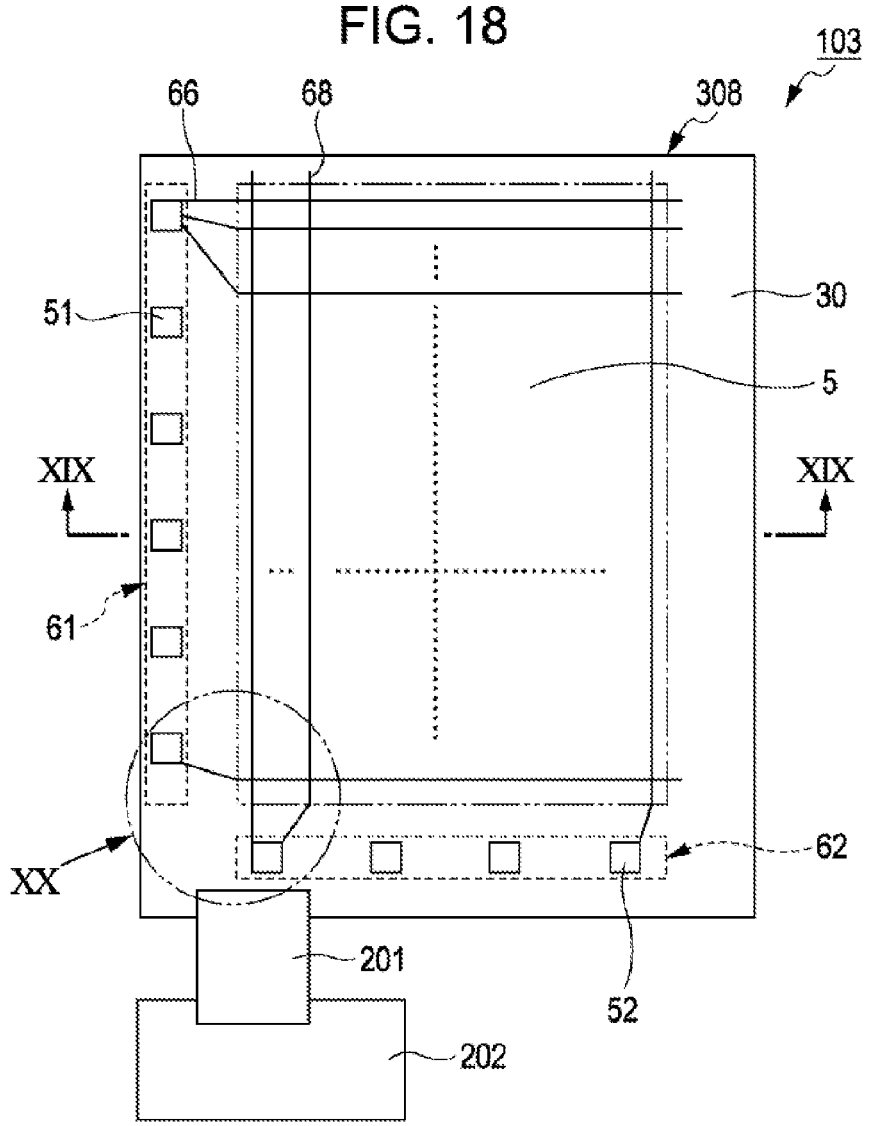
FIG. 18 is a cross-sectional view showing a schematic configuration of a component substrate, which configures an electro-optical device, according to a ninth embodiment.
Figure 19:
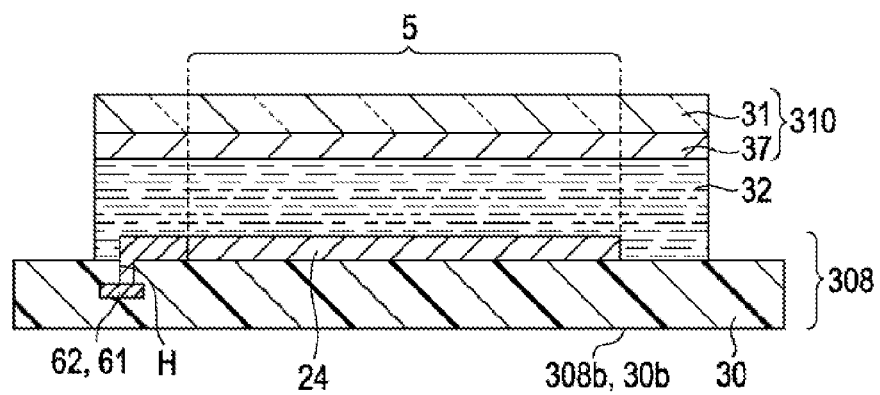
FIG. 19 is a cross-sectional view showing a schematic configuration of an electro-optical device.

FIG. 18 is a cross-sectional view showing a schematic configuration of a component substrate, which configures an electro-optical device, according to a ninth embodiment. FIG. 19 is a cross-sectional view showing a schematic configuration of an electro-optical device.

As shown in FIGS. 18 and 19, in this embodiment, a scanning line driving circuit 61 and a data line driving circuit 62 that are formed from driving drivers 51 and 52 are buried inside a first substrate 30 that configures a component substrate 308.

More specifically, the scanning line driving circuit 61 and the data line driving circuit 62 are buried inside the first substrate 30 that is formed from a polyimide material in a non-display area, a plurality of the driving drivers 51 and 52 formed from electronic components (IC) 10 are connected to scanning lines 66 or data lines 68 through a contact hole H that is formed from Cu.

On the component substrate 308, an opposing substrate 310 is arranged so as to face the component substrate 308 through an electro-optical element 32. In the opposing substrate 310, an opposing electrode 37 formed from ITO having a thickness of 140 nm is formed on a second substrate 31 that is formed from a PET substrate having a thickness of 0.5 mm.

In the electro-optical device (electric apparatus) 103 according to this embodiment, an external circuit substrate 202 is connected to one side of the component substrate 308 though a connection substrate 201 that is formed from an FPC. In the external circuit substrate 202, circuits such as a power supply and a controller 63 are included. A signal voltage supplied from the external circuit substrate 202 is supplied to driving drivers 51 and 52 that configure the scanning line driving circuit 61 and the data line driving circuit 62 through the connection substrate 201, thereby driving the electro-optical device (electric apparatus) 103.

Here, although the connection substrate 201 and the external circuit substrate 202 are connected, a necessary electronic component may be buried in the first substrate 30. In such a case, a configuration may be employed in which the connection substrate 201 and the external circuit substrate 202 are not used, as shown in FIG. 1.

Also in this embodiment, it is preferable that one side of each one of the driving drivers 51 and 52 that configures the scanning line driving circuit 61 and the data line driving circuit 62 is small, for example, 1 mm. In addition, the arrangement gap between the driving drivers 51 and 52 is set to be larger than the length of one side of each one of the driving drivers 51 and 52. Accordingly, even when the electro-optical device 103 is bent, the driving drivers 51 and 52 do not block the bending.

According to the configuration of this embodiment, the scanning line driving circuit 61 and the data line driving circuit 62 are not mounted on the surface of the first substrate 30 but maintained in the state of being buried inside the first substrate 30, whereby the robustness for bending, falling, or the like is provided. Thereby, a defective connection between the driving drivers 51 and 52 and the scanning line 66 or the data line 68 or the breaking of the driving drivers 51 and 52 can be prevented.

In addition, in this embodiment, the carrier mobility is low (equal or less than a fraction of one monocrystalline Si), and not a TFT of which the pattern rule is high (equal to or more than ten times of a monocrystalline SI) but an IC formed from a monocrystalline semiconductor is used. Accordingly, even in a case where the driving drivers 51 and 52 are arranged outside the display area (non-display area), the mounting area is small, and the frame as the electro-optical device 103 can be formed to be small.

Next, the configuration of the component substrate 308 according to this embodiment described above will be described in more detail.

Figure 20:
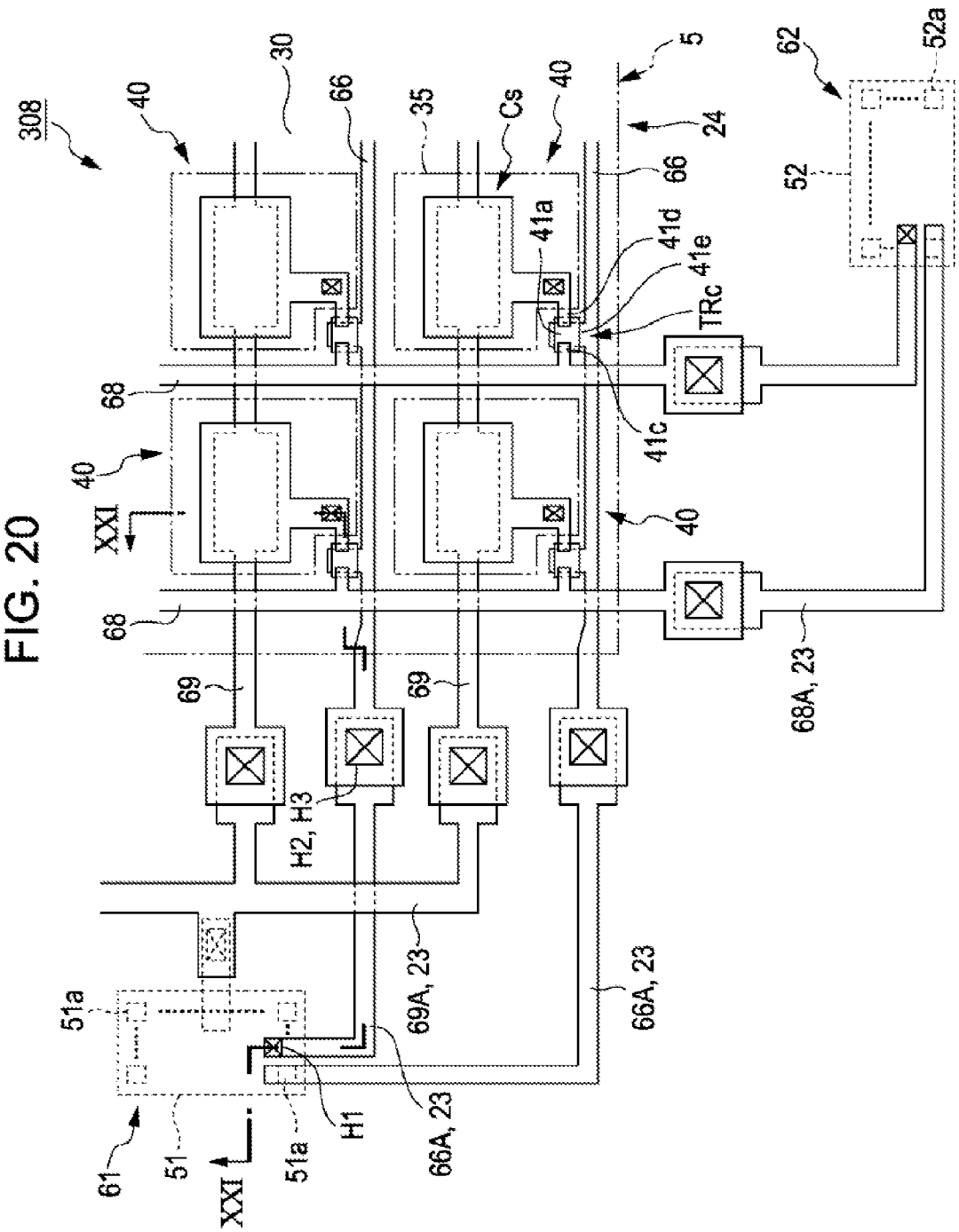
FIG. 20 is an enlarged diagram of a main portion of a component substrate shown in FIG. 18.
Figure 21:
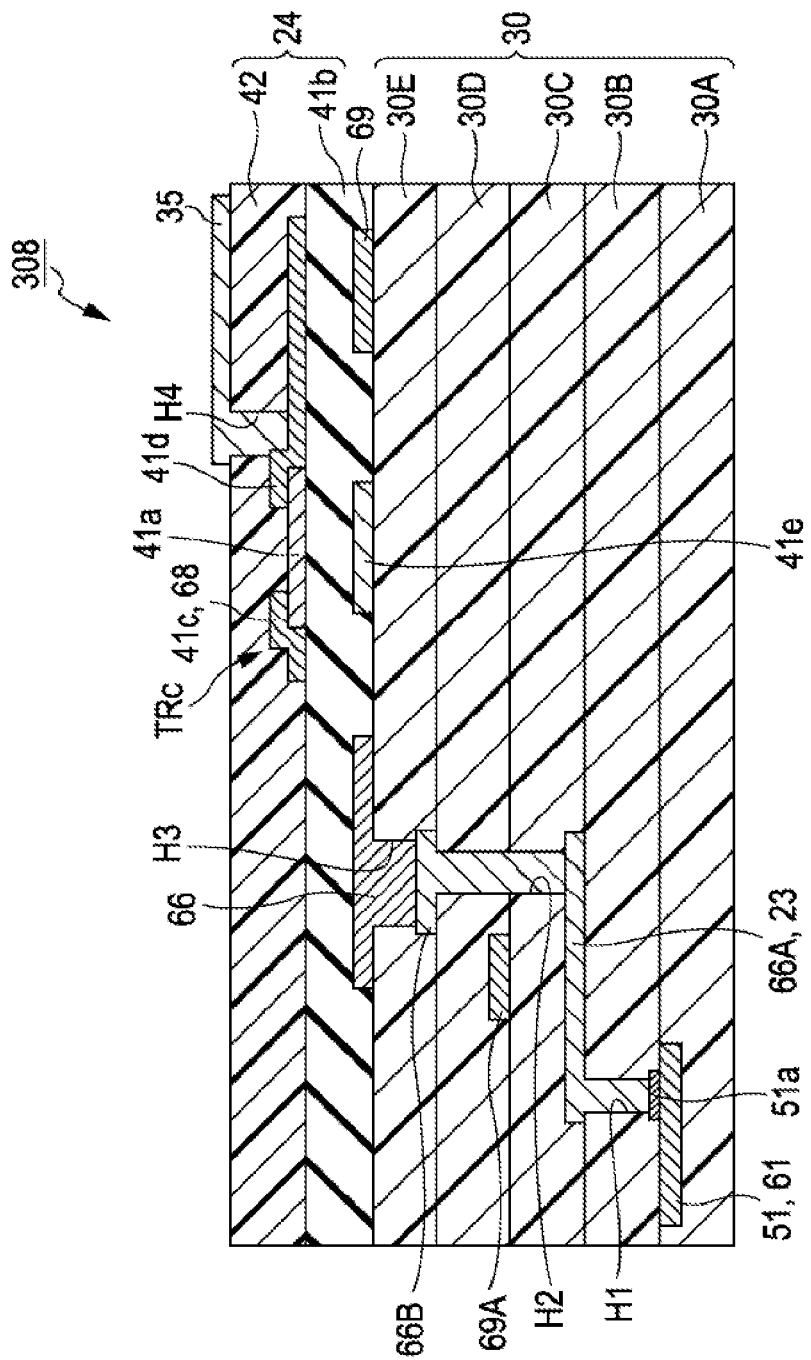
FIG. 21 is a cross-sectional view taken along line XXI-XXI shown in FIG. 20.

FIG. 20 is an enlarged diagram of a main portion (area XX) of the component substrate shown in FIG. 18. FIG. 21 is a cross-sectional view taken along line XXI-XXI shown in FIG. 20.

As described above, in this embodiment, as shown in FIG. 20, a driving circuit layer 24 that includes a pixel electrode 35 and a control transistor TRc is formed in a predetermined area located on the surface of the first substrate 30 that corresponds to a display unit 5, and the scanning line driving circuit 61 and the data line driving circuit 62 as a pixel control unit are buried inside the first substrate 30 on the periphery (non-display area) of the display unit 5. The scanning line driving circuit 61 is formed by a plurality of driving drivers 51. Each driving driver 51 is connected to the scanning line 66 that is drawn out from the display unit 5 through a scanning line connecting wire 66A (connection wire 23) connected to an external connection terminal 51a disposed on the surface thereof. In addition, each driving driver 51 is connected to all holding capacitor lines 69 disposed on the first substrate 30 through a holding capacitor connecting wire 69A (connection wire 23). The data line driving circuit 62 includes a plurality of driving drivers 52.

Each driving driver 52 is connected to the data line 68 (connection wiring 23) drawn out from the display unit 5 through a data line connecting wire 68A that is connected to the external connection terminal 52a disposed on the surface thereof.

As shown in FIG. 21, the component substrate 308 includes a first substrate 30 that is formed by laminating five base members 30A to 30E. In the surface (a face located on the base member 30B side) of the base member 30A that is located on the lowermost layer of the first substrate 30, a plurality of driving drivers 51 (a plurality of driving drivers 52 that configure the data line driving circuit 62) that configure the scanning line driving circuit 61 is buried. A scanning line connecting wiring 66A disposed on the surface of the base member 30B is connected to the external connection terminal 51a exposed to the surface of the driving driver 51 through a contact hole H1.

On the base member 30B, the base member 30C is laminated so as to cover the scanning line connecting wiring 66A, and a holding capacitor connecting wire 69A is formed on the surface of the base member 30C. In addition, on the surface of the base member 30D laminated on the base member 30C, a holding capacitor connecting wire 69B is formed, and the scanning line connecting wire 66A and the scanning line connecting terminal 66B are connected to each other through a contact hole H2 passing through the base members 30C and 30D. Here, it is preferable that the scanning line connecting terminal 66B is formed in an area lager than the area of the contact hole H2 in the plan view.

In addition, the scanning line 66 drawn out from the driving circuit layer 24 on the base member 30E is connected to the scanning line connecting terminal 66B through a contract hole H3. Since the formation area of the above-described scanning line connecting terminal 66B is set to be larger than the area of the contact hole H2 in the plan view, the contact hole H3 can be formed in a size larger than that of the contact hole H2. Accordingly, even in a case where the component substrate 308 is bent, the state of the connection between the contact hole H3 and the scanning line connecting terminal 66B is good.

When the scanning line 66 disposed on the surface of the first substrate 30 is connected to the scanning line connecting wire 66A buried on the lower side of the first substrate 30, in a case where they are connected through one contact hole passing through a plurality of base members 30A to 30E, a defective connection may be formed in a case where the component substrate 308 is used in a bent state. In contrast to this, by connecting a plurality of the contact holes H2 and H3 through the scanning line connecting terminal 66B and increasing the connection areas of the contact holes H2 and H3 by forming the thickness of the contact hole H3 located on the upper layer side to be large or the like, such a connection state can be maintained to be god. In addition, by configuring the formation area of the scanning line connecting terminal 66B to be larger than the area (so-called, the thickness) of each one of the contact holes H2 and H3 in the plan view, a defective connection between the scanning line 66 and the scanning line connecting wire 66A (driving driver 51) can be prevented further.

On the first substrate 30 (base member 30E), a gate electrode 41e and a holding capacitor line 69 are formed in addition to the scanning line 66, and a gate insulating film 41b is formed on the entire surface of the first substrate 30 so as to cover the scanning line 66, the gate electrode 41e, and the holding capacitor line 69. On the gate insulating film 41b, a semiconductor layer 41a that configured the control transistor TRc is disposed, and a source electrode 41c and a drain electrode 41d are disposed so as to be seated on the peripheral edge portion thereof. In addition, a protection film 42 is disposed so as to cover the entire surface of the gate insulating film 41b, and a pixel electrode 35 is disposed on the surface thereof. This pixel electrode 35 is connected to the drain electrode 41d of the control transistor TRc through a contact hole H4 formed in the protection film 42.

Accordingly, the component substrate 308 is configured in which the scanning line driving circuit 61 and the data line driving circuit 62 are buried inside the first substrate 30 that is formed from five base members 30A to 30E formed from polyimide.

In the component substrate 308 according to this embodiment, the contact hole H1 is configured by a part of the scanning line connecting wire 66A, a contact hole H2 is configured by a part of the scanning line connecting terminal 66B, the contact hole H3 is configured by a part of the scanning line 66, and the contact hole H4 is configured by a part of the pixel electrode 35. Accordingly, even in a case where the component substrate 308 is bent, it is difficult for a defective connection to occur in the connection portions of wirings and terminals that are connected through the contact holes H1 to H4. In addition, this applies the same to the holding capacitor line 69, the common electric potential line (a wiring used for applying a voltage to the opposing electrode 37 and the like: not shown), and the like.

Figure 22:
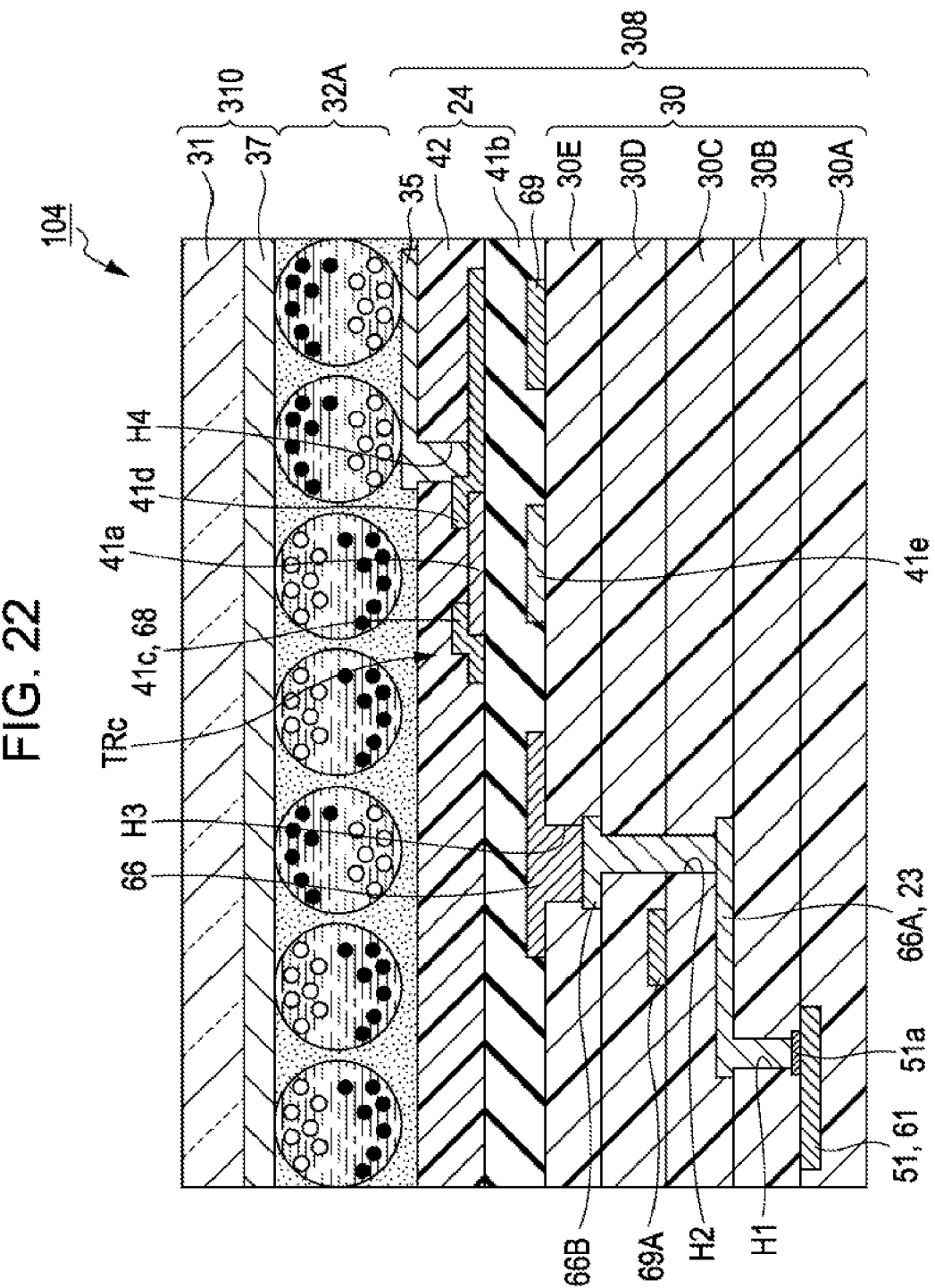
FIG. 22 is a partial cross-sectional view showing a case where the component substrate according to the ninth embodiment is applied to an electrophoretic display device.

FIG. 22 is a partial cross-sectional view showing a case where the component substrate according to the ninth embodiment is applied to an electrophoretic display device.

The electrophoretic display device (electric apparatus) 104 shown in FIG. 22 is formed by interposing an electrophoretic element 32A between the component substrate 308 and the opposing substrate 310. As above, an electrophoretic material may be used as the electro-optical material. In the electrophoretic element 32A, a plurality of microcapsules 20 is arranged. Black particles and white particles that are maintained inside each microcapsule 20 and charged with different polarities move in accordance with a voltage applied between the pixel electrode 35 and the opposing electrode 37, whereby a display is performed.

Figure 23:
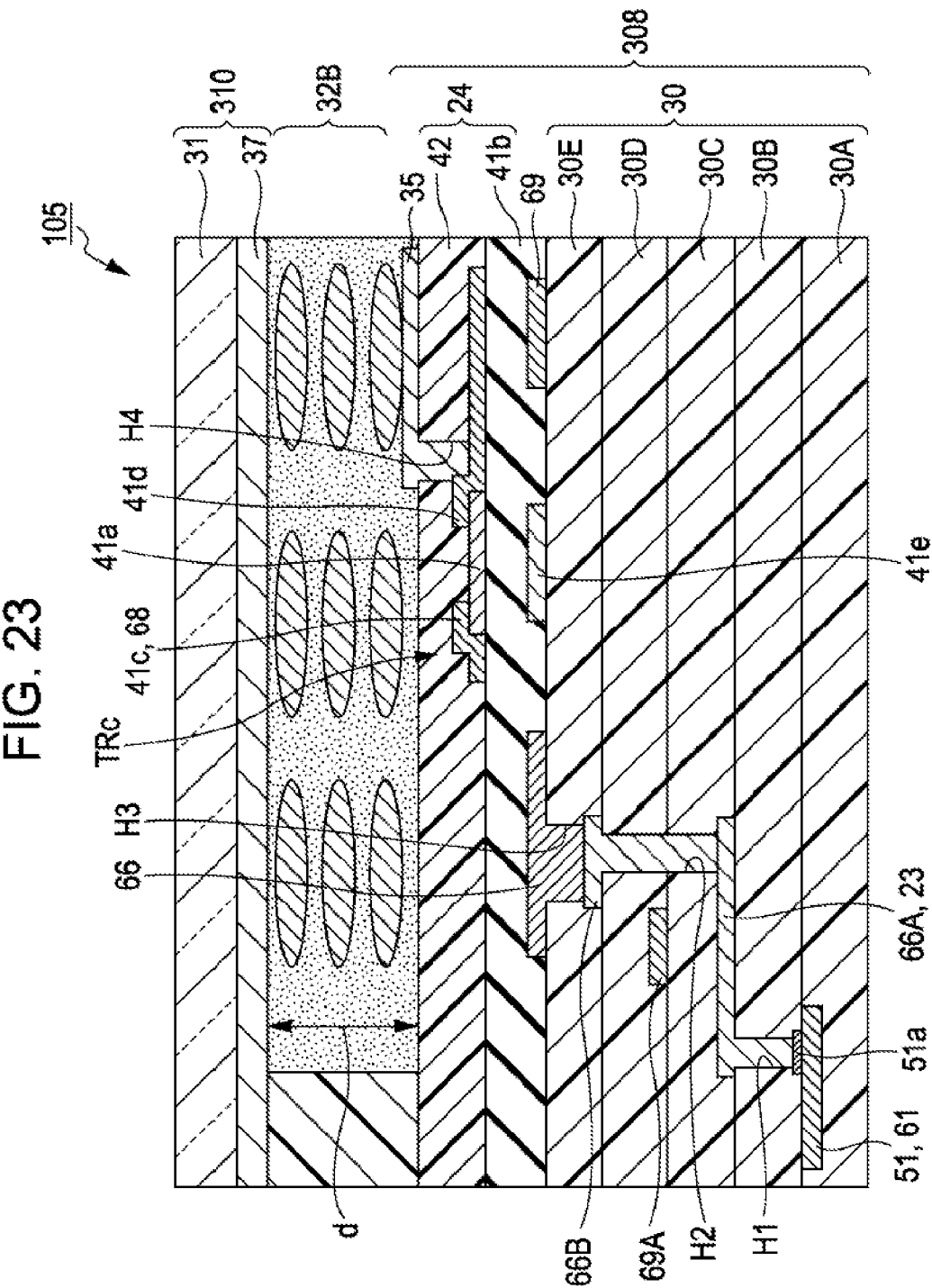
FIG. 23 is a partial cross-sectional view showing a case where the component substrate according to the ninth embodiment is applied to a liquid crystal display device.

FIG. 23 is a partial cross-sectional view showing a case where the component substrate according to the ninth embodiment is applied to a liquid crystal display device.

In the liquid crystal display device 105 (electric apparatus) shown in FIG. 23, a liquid crystal element 32B is interposed between the component substrate 308 and the opposing substrate 310. As above, a liquid crystal material may be used as the electro-optical material. As the liquid crystal, a liquid crystal such as a guest host liquid crystal, a PDLC (Polymer Dispersed Liquid Crystal), or a PNLC (Polymer Network Liquid Crystal) that has a low influence of a cell gap d is preferably used. Generally, the liquid crystal is optically designed based on a product $\Delta n \cdot d$ of the cell gap d and the anisotropy $\Delta n$ of the refractive index. In a case where a flexible substrate is used, the cell gap changes when the liquid crystal display device is bent. Accordingly, there is a case where the color or the contrast of the display is shifted when the liquid crystal display device is rounded in a cylinder shape. Therefore, although the above-described liquid crystal material is preferably used, any other liquid crystal materials may be used.

Here, in a case where the liquid crystal material is used, the liquid crystal material does not have a memory property, and accordingly, it is preferable that a volatile memory such as a SRAM is arranged for each pixel.

In addition, although not shown in FIG. 23, a polarizing plate is necessary in a case where the liquid crystal display device 105 is configured. In contrast to this, in the case of the above-described electrophoretic display device 104, a polarizing plate is not necessary, and accordingly, a bright display can be performed.

Furthermore, instead of the liquid crystal material, electroluminescence, electrochromic, electrowetting, or the like may be used.

In each embodiment described above, as the material of the first substrate 30 that configures the component substrates 300 to 308, a polyimide material having flexibility is used. Generally, a material having flexibility is an organic material, and the organic material has a linear expansion coefficient having one order of magnitude higher than the inorganic material that is rigid and a heat transfer coefficient having one less digit than the inorganic material. Accordingly, when the component substrate (first substrate) generates heat, the heat is accumulated so as to grow the substrate. Therefore, a bent state occurs in the electro-optical device.

In addition, in the state in which the bent state in the component substrate occurs, when the electro-optical device is used in a bent state, another defect such as a defective connection between the IC and the connection wiring, formation of a short circuit in the connection wiring, or the like. Generally, in an electro-optical device using electroluminescence, as a countermeasure for the heat generation of the component substrate, an inorganic substrate including a heat diffuser is used. From this viewpoint, an electro-optical material having a small amount of heat generation is preferably used in a component substrate that has flexibility or uses a material having an organic material as its main body. The material that generates a small amount of heat is a material that has a low current or a low voltage when a display is performed. The most preferable material is a material that has a memory property. More specifically, the material is an electrophoretic material or an electrochromic material. When a voltage is applied to an electric apparatus using such a material once, the display can be maintained even in a state in which no voltage is applied thereto. A material that is preferable next thereto is a material that is driven a voltage such as a liquid crystal or electrowetting. On the other hand, a material that is the least preferable is electroluminescence that is driven by a current.

Tenth Embodiment

Next, a schematic configuration of a component substrate, which configures an electro-optical device, according to a tenth embodiment will be described.

Figure 24:
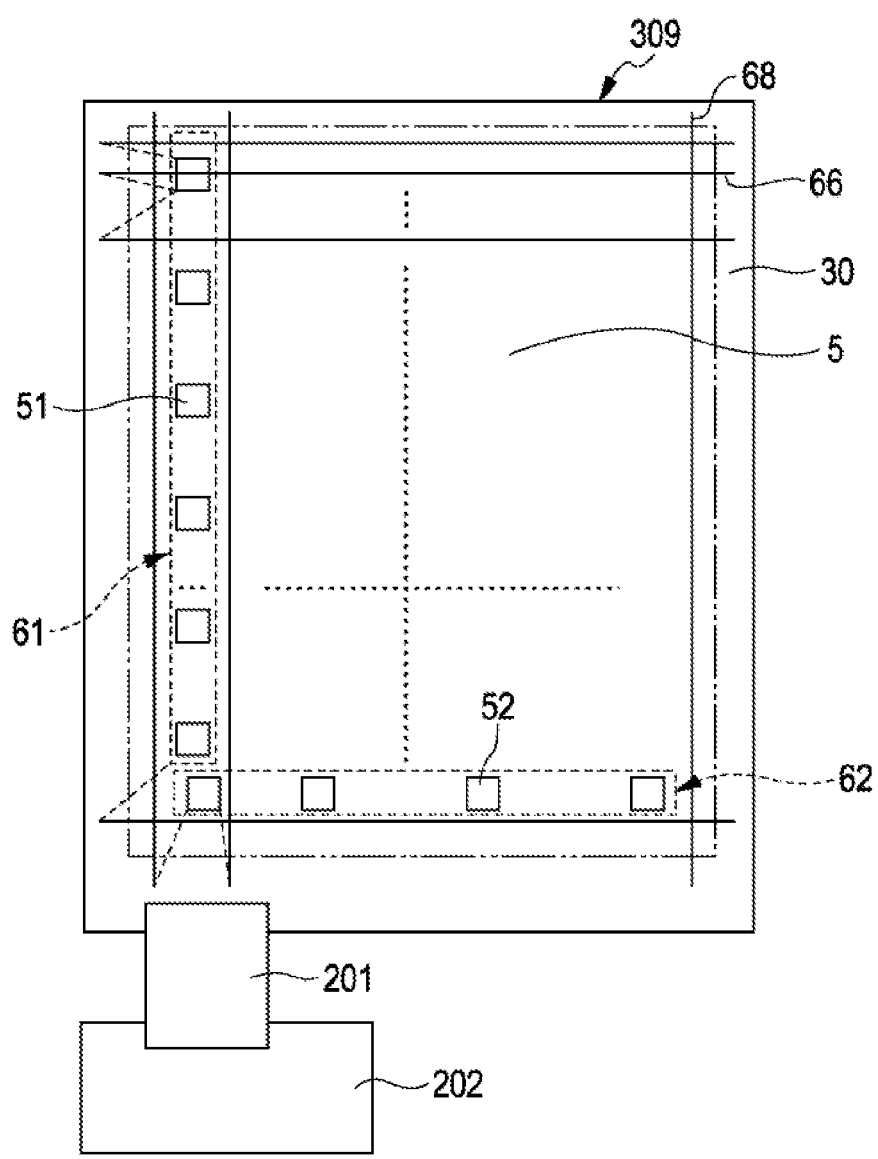
FIG. 24 is a plan view showing a schematic configuration of a component substrate according to a tenth embodiment.
Figure 25:
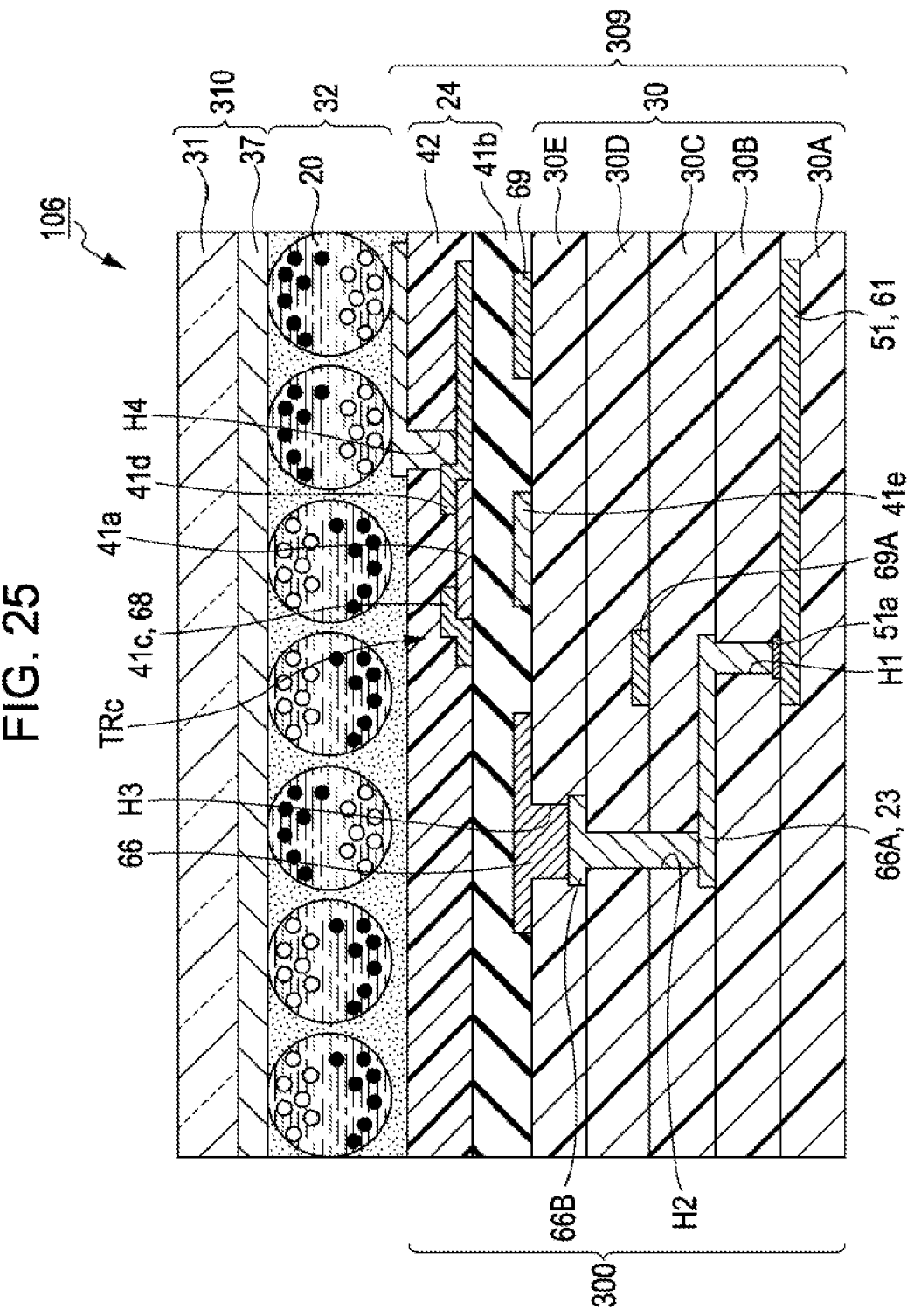
FIG. 25 is a partial cross-sectional view of an electrophoretic display device that includes the component substrate according to the tenth embodiment.

FIG. 24 is a plan view showing a schematic configuration of a component substrate according to a tenth embodiment. FIG. 25 is a partial cross-sectional view of an electro-optical device that includes the component substrate according to the tenth embodiment.

As shown in FIG. 24, in the component substrate 309 according to this embodiment, a scanning line driving circuit 61 and a data line driving circuit 62 are arranged inside a first substrate 30 corresponding to a display area (display unit 5). More specifically, as shown in FIG. 25, the scanning line driving circuit 61 and the data line driving circuit 62 are buried inside the first substrate 30 that is located to the lower side of a control transistor TRc connected to a pixel electrode 35.

Accordingly, on the periphery of the display area (display unit 5: FIG. 24) of the electrophoretic display device (electric apparatus) 106, only connection portions between the scanning line 66, the data line 68, and the like and connection wirings are present. Accordingly, the frame can be formed to be narrower than that of the electro-optical device according to each embodiment described above, and, more specifically, a frame width equal to or less than 0.1 mm can be realized.

In addition, not all the driving drivers 51 and 52 that configure the scanning line driving circuit 61 and the data line driving circuit 62 but only parts of the driving drivers 51 and 52 may be buried inside the first substrate 30 of the display area. Like the ninth embodiment, electronic components 10 used in the connection substrate 201 and the external circuit substrate 202 may be buried inside the first substrate 30.

Here, it is known that the characteristics of the liquid crystal material, the electrophoretic material, the electrochromic material, or the like change in accordance with the moisture. For example, when much moisture is included in the material, the leakage current increases, and accordingly, the power consumption increases. In order to prevent this, it is important to form a moisture-resistant structure.

Hereinafter, the configuration of a component substrate having a moisture-resistant structure will be described.

Eleventh Embodiment

Figure 26:
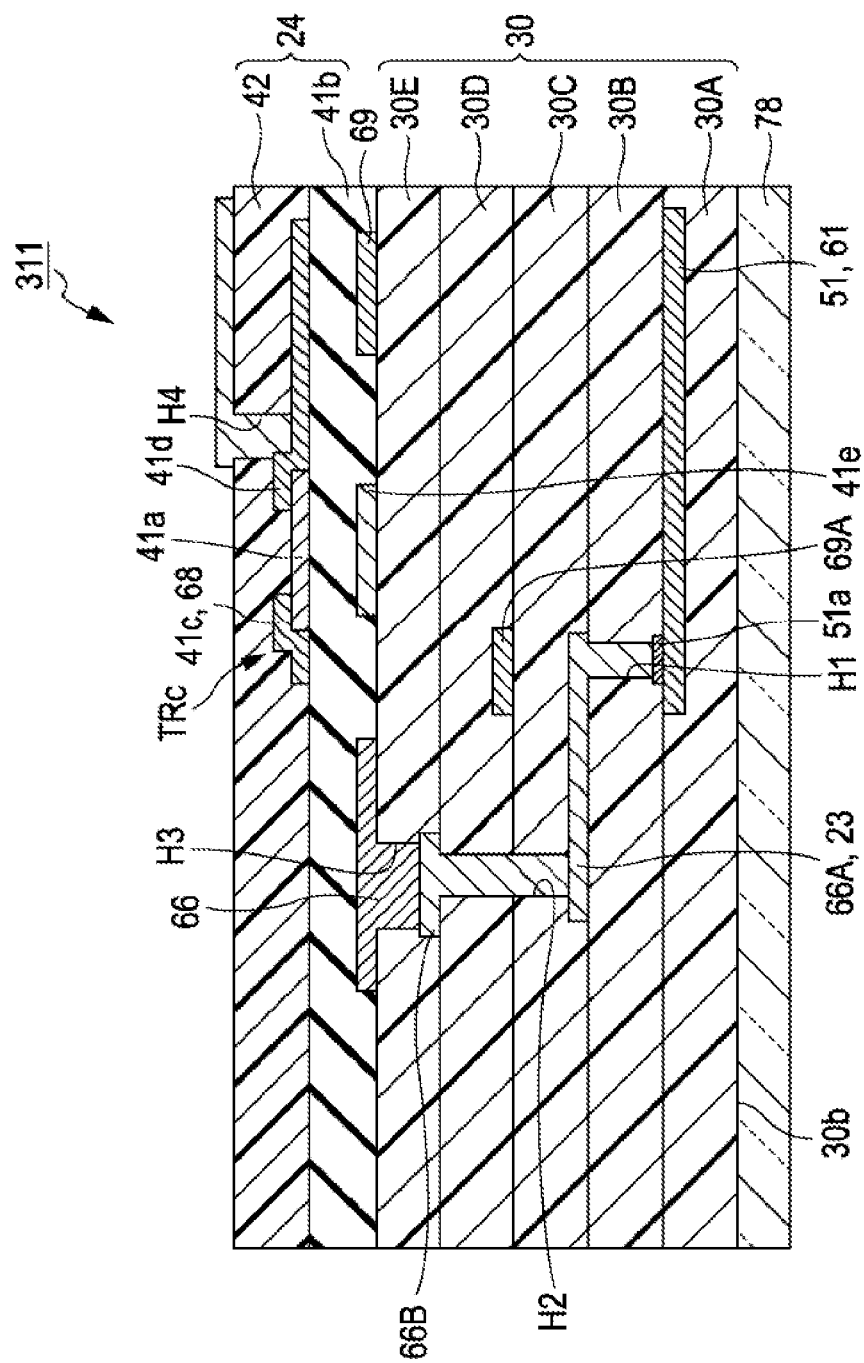
FIG. 26 is a partial cross-sectional view showing a schematic configuration of a component substrate, which configures an electro-optical device, according to an eleventh embodiment.

FIG. 26 is a partial cross-sectional view showing a schematic configuration of a component substrate, which configures an electro-optical device, according to an eleventh embodiment.

As shown in FIG. 26, in the component substrate 311 according to this embodiment, a moisture-resistant substrate 78 formed from glass is disposed. This moisture-resistant substrate 78 is formed from a glass substrate of which the thickness is decreased up to a thickness of 20 μm and is bonded to the rear face 30b (the rear face of the base member 30A) of the first substrate 30. As above, by arranging the moisture-resistant substrate 78 at least on the rear face side of the component substrate 311, the moisture resistance for the electro-optical element can be increased. Accordingly, it can be prevented that a leakage current increases due to the penetration of moisture, and the power consumption increases. Therefore, a good display can be performed for a long period, whereby reliability is improved.

Here, the moisture-resistant substrate 78 can be applied to the component substrate according to each embodiment described above.

In addition, the moisture-resistant substrate 78 may be disposed on the outer face side of the opposing substrate 310. In such a case, since the moisture-resistant substrate 78 is disposed on the visible side, it needs to have transparency.

Twelfth Embodiment

Figure 27:
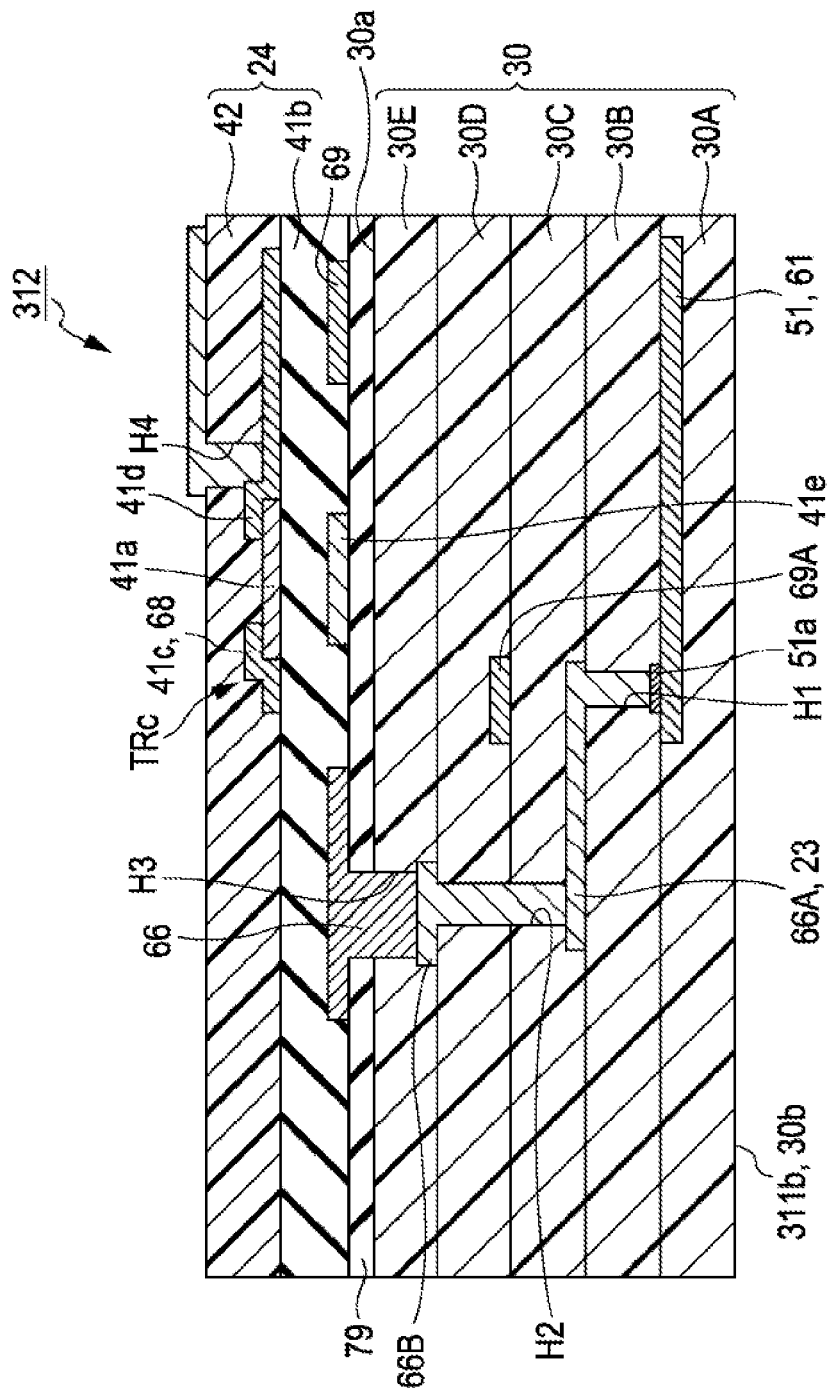
FIG. 27 is a partial cross-sectional view showing a schematic configuration of a component substrate, which configures an electro-optical device, according to a twelfth embodiment.

FIG. 27 is a partial cross-sectional view showing a schematic configuration of a component substrate, which configures an electro-optical device, according to a twelfth embodiment.

As shown in FIG. 27, in the component substrate 312 according to this embodiment, a moisture-resistant layer 79 formed from nitride silicon is disposed on the surface 30a of a first substrate 30. This moisture-resistant layer 79 is formed as a film by coating and sintering an organic material including silicon. Here, although the moisture-resistant layer 79 is arranged on the surface 30a of the first substrate 30, the position of the moisture-resistant layer 79 is not limited thereto, and the moisture-resistant layer 79 may be disposed between base members 30A to 30E configuring the first substrate 30. In addition, the moisture-resistant layer 79 may be disposed between a plurality of substrates. Furthermore, a different inorganic material such as a silicon oxide or an organic material may be used. In addition, the moisture resistance may also be given to the material of the first substrate 30. Furthermore, the moisture-resistant layer 79 may be disposed on the opposing substrate 310 side.

As above, by employing a configuration in which the moisture-resistance for the electro-optical element 32 is improved by arranging the moisture-resistant layer 79 inside the component substrate 312, an increase in the power consumption accompanied with a leakage current or the shift of a threshold voltage Vth can be prevented.

Thirteenth Embodiment

Figure 28A:
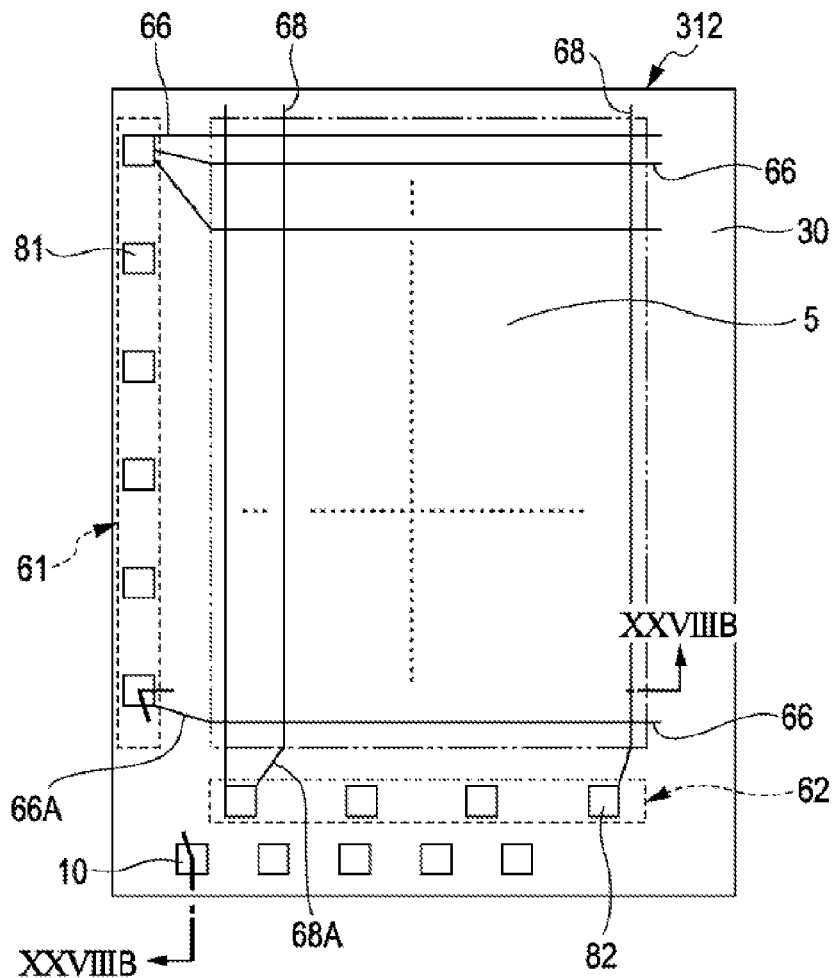
FIG. 28A is a plan view showing a schematic configuration of a component substrate, which configures an electro-optical device, according to a thirteenth embodiment.

FIG. 28A is a plan view showing a schematic configuration of a component substrate, which configures an electro-optical device, according to a thirteenth embodiment.

Figure 28B:
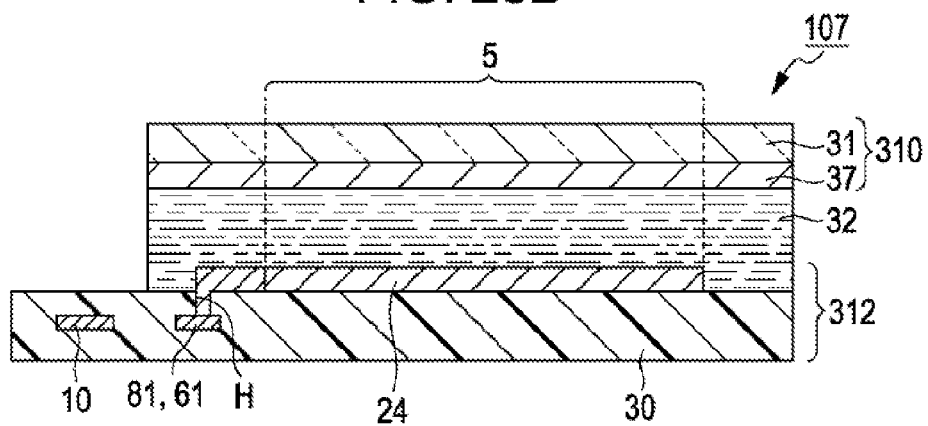
FIG. 28B is a cross-sectional view taken along line XXVIIIB-XXVIIIB shown in FIG. 28A.

FIG. 28B is a cross-sectional view taken along line XXVIIIB-XXVIIIB shown in FIG. 28A. FIG. 29 is a partial cross-sectional view showing a detailed configuration of the component substrate.

As shown in FIGS. 28 and 29, in the component substrate 312 according to this embodiment, a scanning line driving circuit 61 formed from a plurality of drivers IC 81 and IC 82, a data line driving circuit 62, and a plurality of electronic components 10 are buried inside a first substrate 30. The scanning line driving circuit 61 is formed to include a plurality of driver ICs 81, and the data line driving circuit 62 is formed to include a plurality of driver ICs 82 (FIG. 28). A scanning line 66 formed on the first substrate 30 is connected to the driver IC 81 through a scanning line connecting wiring 66A connected to an external connection terminal 81a exposed to the surface thereof and a scanning line connecting terminal 66B. In addition, a data line 68 is connected to the driver IC 82 (FIG. 28) through a data line connecting wire 68A (FIG. 28) connected to an external connection terminal (not shown) that is exposed to the surface thereof.

Method of Manufacturing Thin-Film Transistor

FIGS. 30A to 30D are process diagrams showing a method of manufacturing a thin-film transistor having a BGTG structure.

Generally, in a case where a thin-film transistor is formed on a substrate, the thin-film transistor is formed by sequentially forming the constituent elements of the thin-film transistor as films from the substrate side. However, the method of forming the transistor is not limited thereto, and, for example, as shown in FIG. 30A, first, a gate electrode 41e is formed on the surface 86a of the substrate 86. Thereafter, as shown in FIG. 30B, a gate insulating film 41b is disposed on the substrate 86 so as to cover the gate electrode 41e, and a semiconductor layer 41a is patterned and formed at a predetermined position on the gate insulating film 41b that faces the gate electrode 41e.

On the other hand, as shown in FIG. 30C, in another substrate 87, a source electrode 41c and a drain electrode 41d are formed on the rear face 87b side, and a pixel electrode 35 is formed on the surface 87a side. In such a case, the source electrode 41c and the drain electrode 41d are formed on the rear face 87b side of the substrate 87. Thereafter, a through hole 88 passing through the substrate 87 in the thickness direction from the surface 87a side is formed, and the pixel electrode 35 is formed on the surface 87a such that a part of the pixel electrode material enters inside the through hole 88. Through the contact hole H formed as described above, the pixel electrode 35 located on the surface 87a side is connected to the drain electrode 41d located on the rear face 87b side.

Next, as shown in FIG. 30D, in a state in which the surface 86a side of the substrate 86 that includes the gate electrode 41e, the gate insulating film 41b, and the semiconductor layer 41a and the rear face 87b side of the substrate 87 that includes the source electrode 41c, the drain electrode 41d, and the pixel electrode 35 face each other, the substrate 86 and the substrate 87 are tightly pressed so as to be bonded together.

The thin-film transistor TR may be configured as above. The thin-film transistor configured as above may be used in this embodiment.

Another Configuration of Control Transistor TRc

Figure 31:
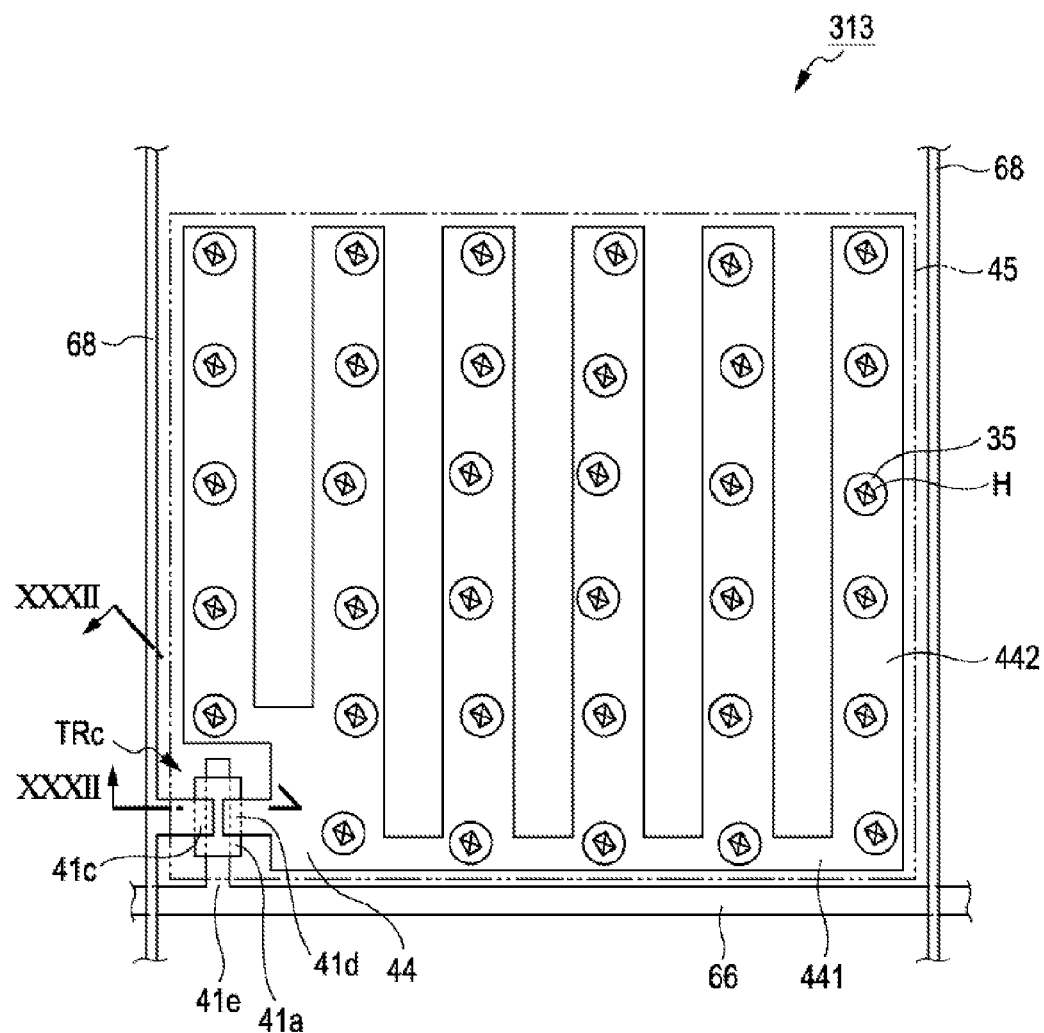
FIG. 31 is a plan view showing a schematic configuration of a component substrate, which configures an electro-optical device, according to a fifteenth embodiment.

FIG. 31 is a plan view showing a schematic configuration of a control transistor TRc that configures an electro-optical device, and FIG. 33 is a cross-sectional view taken along line XXXIII-XXXIII shown in FIG. 31. In addition, in FIGS. 31 and 32, the configuration of one pixel is illustrated.

Figure 32:
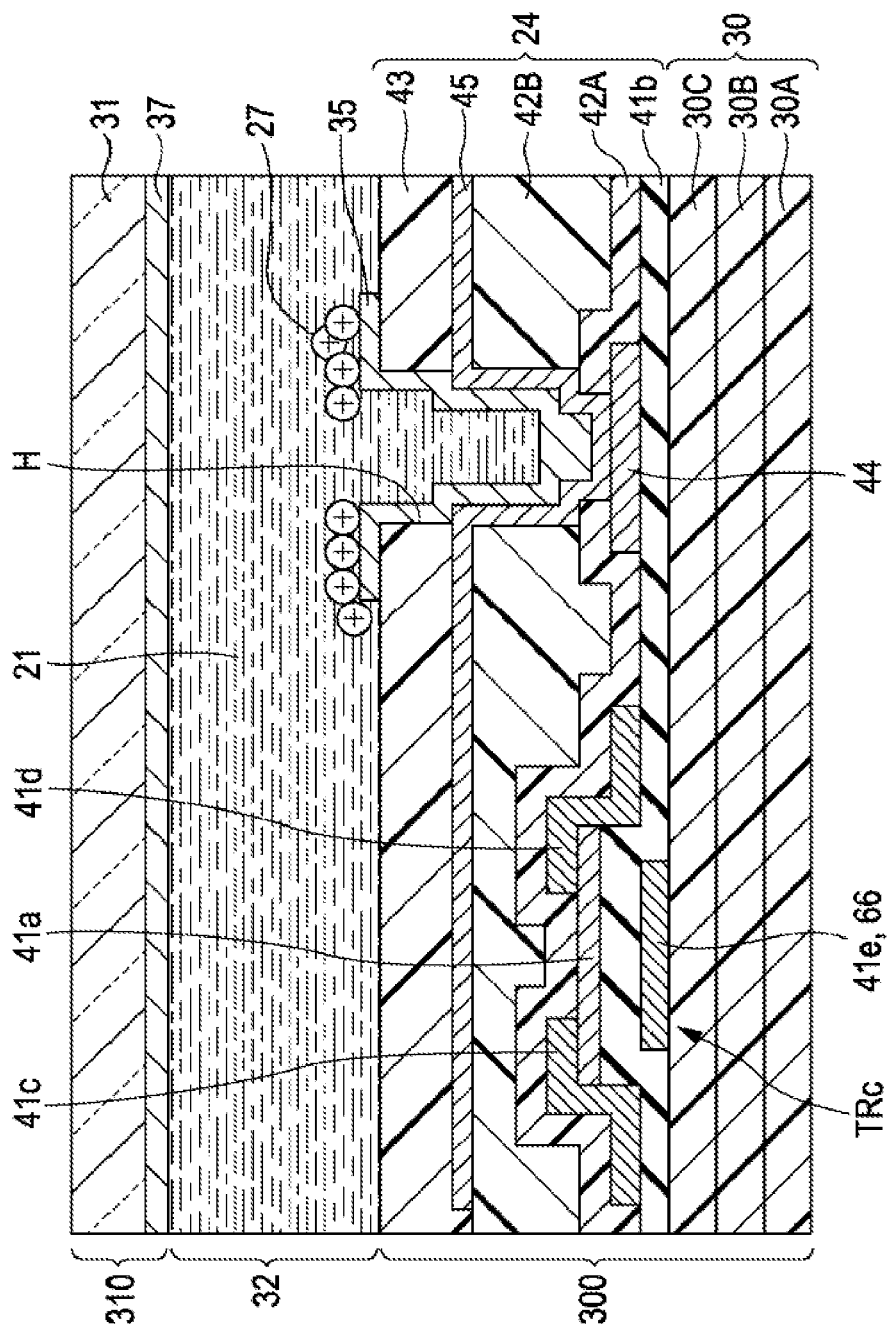
FIG. 32 is a cross-sectional view taken along line XXXII-XXXII shown in FIG. 32.

In each embodiment described above, although a configuration is formed in which one pixel electrode and one control transistor are disposed for each pixel, as shown in FIGS. 31 and 32, a configuration may be employed in which a plurality of island-shaped pixel electrodes 35 is included within one pixel 40. Although not shown in FIGS. 31 and 32, a pixel control circuit is buried inside the first substrate 30 that is formed from three base members 30A to 30C. On this first substrate 30, a first protection film 42A and a second protection film 42B are laminated in the mentioned order so as to cover the control transistor TRc disposed for each pixel. The first protection film 42A and the second protection film 42B are respectively formed from a photosensitive acryl material having a thickness of 1 μm. On the second protection film 42B, a reflection layer 45 is disposed for each pixel. This reflection layer 45 is formed by using an Ag paste having a thickness of 200 nm and has a size occupying approximately the entire pixel area. By employing a configuration that includes the reflection layer 45, external light incident from the opposing substrate 310 side is reflected, whereby a bright image is acquired.

In addition, by arranging the reflection layer 45 that also serves as a light shielding film on the control transistor TRc, the incidence of leakage light (external light) to the control transistor TRc (channel region) can be blocked. Accordingly, the influence of the optical leakage current of the control transistor on the image is suppressed, whereby an excellent image display can be performed.

A protection film 43 that also serves as a flattening film is disposed on the entire surface of the second protection film 42B so as to cover a plurality of the reflection layers 45 arranged for each pixel. In addition, on this protection film 43, a plurality of island-shaped pixel electrodes 35 representing a circular shape in the plan view is disposed for each pixel.

Each pixel electrode 35 is connected to a connection electrode 44 disposed on the lower-layer side through a contact hole H that is configured by a part of the reflection layer material and a part of the pixel electrode material. This connection electrode 44 is connected to the drain electrode 41d of the control transistor TRc and is formed in the same process of the drain electrode 41d, represents a comb-teeth shape, and is formed to include a stem portion 441 extending along the scanning line 66 and a plurality of branch portions 442 that are connected by the stem portion 441. As above, a plurality of the pixel electrodes 35 within one pixel is connected to each other through the connection electrode 44 and is simultaneously driven.

On the component substrate 300, an opposing substrate 310 that includes an opposing electrode 37 through an electrophoretic element (electro-optical element 32) is disposed. The electrophoretic element (electro-optical element 32) is configured by a dispersion medium 21 and a plurality of charged particles 27 maintained in the middle of the dispersion medium 21. As the electrophoretic element (electro-optical element 32), an element that is formed by a dispersion medium 21 and arranging a plurality of microcapsules having a plurality of particles 27 maintained in the dispersion medium 21 is used. In addition, a partition other than the microcapsule or an electrophoretic element having no partition may be used.

Examples of Component Substrate

Figure 33A:
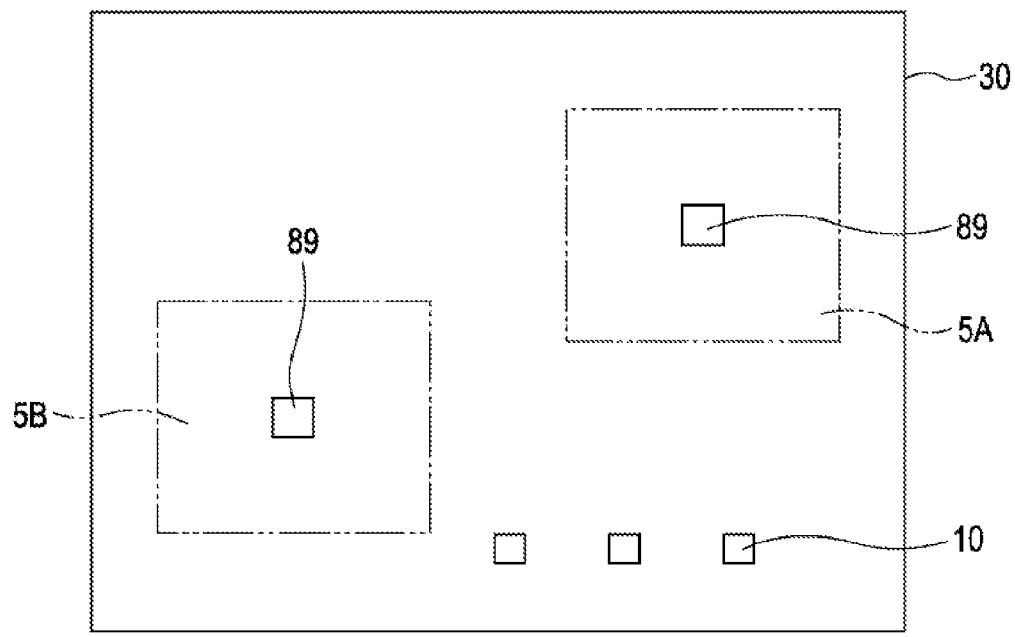
FIG. 33A is a plan view showing a modified example of a component substrate that configures an electro-optical device.
Figure 33B:
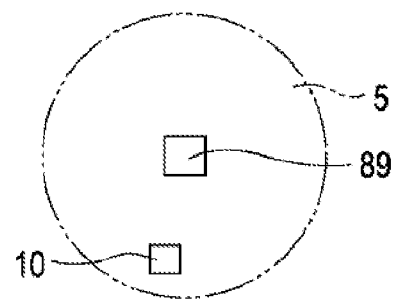
FIGS. 33B and 33C are plan views showing examples of the shape of a display unit.
Figure 33C:
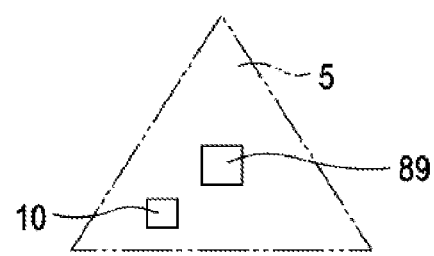

FIG. 33A is a plan view showing a modified example of a component substrate that configures an electro-optical device. FIGS. 33B and 33C are plan views showing examples of the shape of a display unit.

In the embodiments described above, although a component substrate having one display unit has been described, as shown in FIG. 34A, a plurality of (two in FIG. 33A) display units 5A and 5B may be included in one component substrate.

Inside the first substrate 30 configuring the component substrate, drivers IC 89 as pixel control circuits are buried in areas overlapping the display units 5A and 5B in the plan view and drives the control transistors TRc disposed in the display units 5A and 5B.

In addition, by employing a configuration in which the driver IC 89 is included inside the display unit 5, the shape of the display unit 5 in the plan view can be freely set. For example, the shape of the display unit 5 may be not only a rectangular shape but also a triangular shape (polygonal shape) in the plan view or a circular shape (oval shape) in the plan view as shown in FIGS. 33B and 33C. Furthermore, the size or the arrangement position of the pixel electrode 35 may be freely laid out, whereby the design of the electro-optical device can be performed more freely. Accordingly, an electro-optical device having a bent shape or an electro-optical device of which the shape in the plan view is a shape other than a rectangular shape can be easily realized.

In the case of a rigid substrate formed from general glass, it is not easy to process the first substrate 30 and the second substrate 31 in a complicated shape such as a circle or a polygon. However, since the substrate is a flexible substrate, it can be easily processed in an arbitrary shape by cutting it by using scissors or the like. Furthermore, in a case where the first substrate 30 and the second substrate 31 are formed by members having elasticity, the electro-optical device also has elasticity and can be attached to another base member having elasticity or base member having a complicated shape without forming any gap therebetween. Accordingly, the function of the electro-optical device can be given to a member located at an arbitrary position and an arbitrary shape.

Configuration Example of Large-Size Electro-Optical Device

Figure 34:
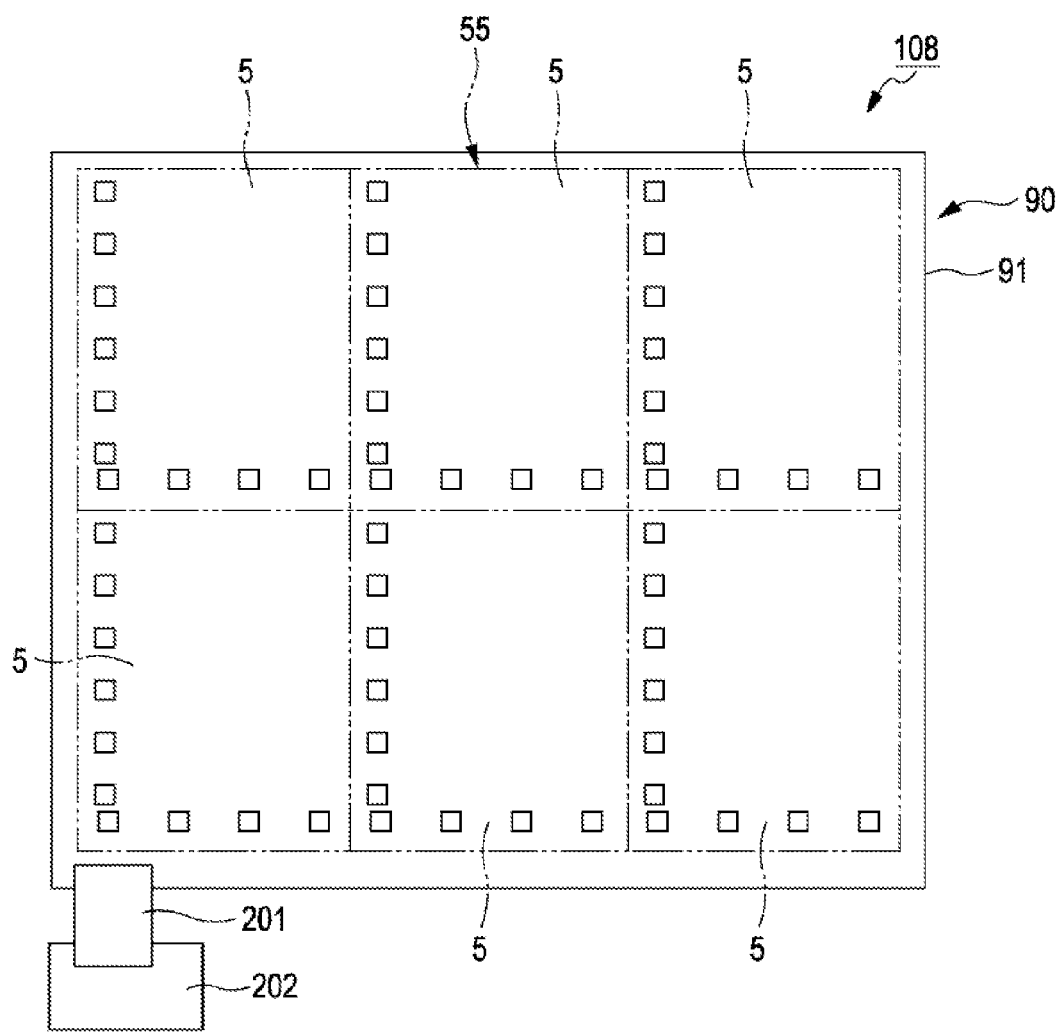
FIG. 34 is a plan view showing a schematic configuration of an electro-optical device having a large size.

FIG. 34 is a plan view showing a schematic configuration of an electro-optical device having a large size. Here, the opposing substrate and the electro-optical device are not shown in the figure.

A display panel shown in FIG. 35 employs the configuration of the component substrate according to the tenth embodiment. This electro-optical device (electric apparatus) 108 includes a component substrate 90 that has a display area 55 formed from a plurality of display units 5 on one substrate 91. Inside the substrate 91 corresponding to each display unit 5, pixel driving circuits including the scanning line driving circuit 61, the data line driving circuit 62, and the like are buried.

On the substrate 91, the plurality of display units 5 configuring the display area 55 is arranged in two rows and three columns and is configured so as to be independently driven. Accordingly, the display areas 55 may be divided into a plurality of blocks, so that each block is independently driven. In a case where an electrophoretic display device having a large size is configured, the capacitance or resistance applied to the wiring increases, and accordingly, the time constant increases, or the power consumption increases. In addition, there is a problem in that a rewriting time of an image increases. By including the plurality of the display units 5, a structure is employed in which the display area 55 is divided into multiple parts, the capacitance or resistance applied to the wiring decreases, and accordingly, the time constant decreases. In addition, since only blocks (display units) of the display area 55 that are necessary may be rewritten, the power consumption decreases. Furthermore, when the rewriting of an image is performed simultaneously for a plurality of blocks, a time required for rewriting an image can be shortened.

Here, electronic components 10 used for the connection substrate 201 and the external circuit substrate 202 may be buried in the first substrate 30, and the substrates may be omitted. The input/output of a signal, power, and the like to or from the outside may be performed by using an electrode (not shown) arranged on the rear-face side of the component substrate 91.

Application to Other Electric Apparatuses

Next, examples will be described in which an electric apparatus including the component substrate of each embodiment described above is applied to other devices.

Figure 35A:
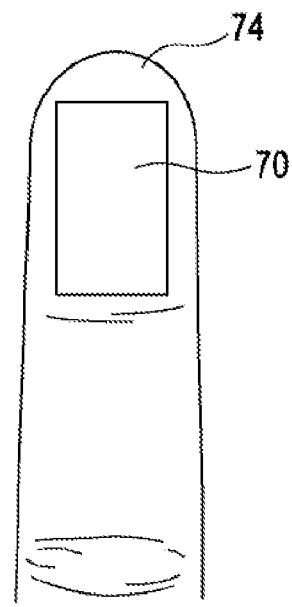
FIGS. 35A and 35B are diagrams showing an example in which a pressure-sensitive sensor is disposed at the fingertip of a robot.
Figure 35B:
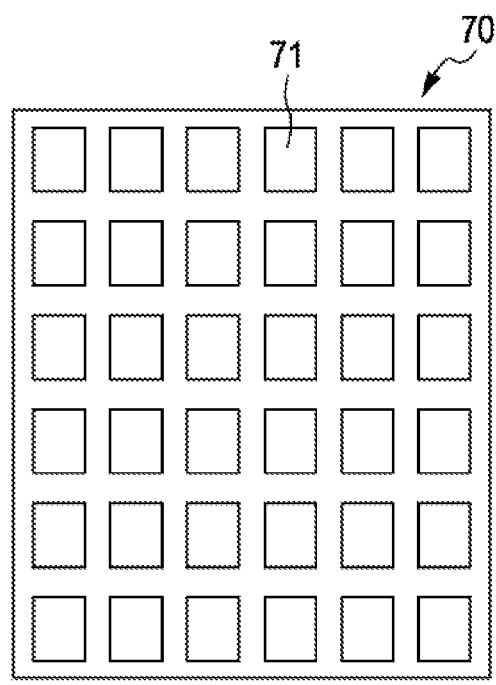
Figure 36:
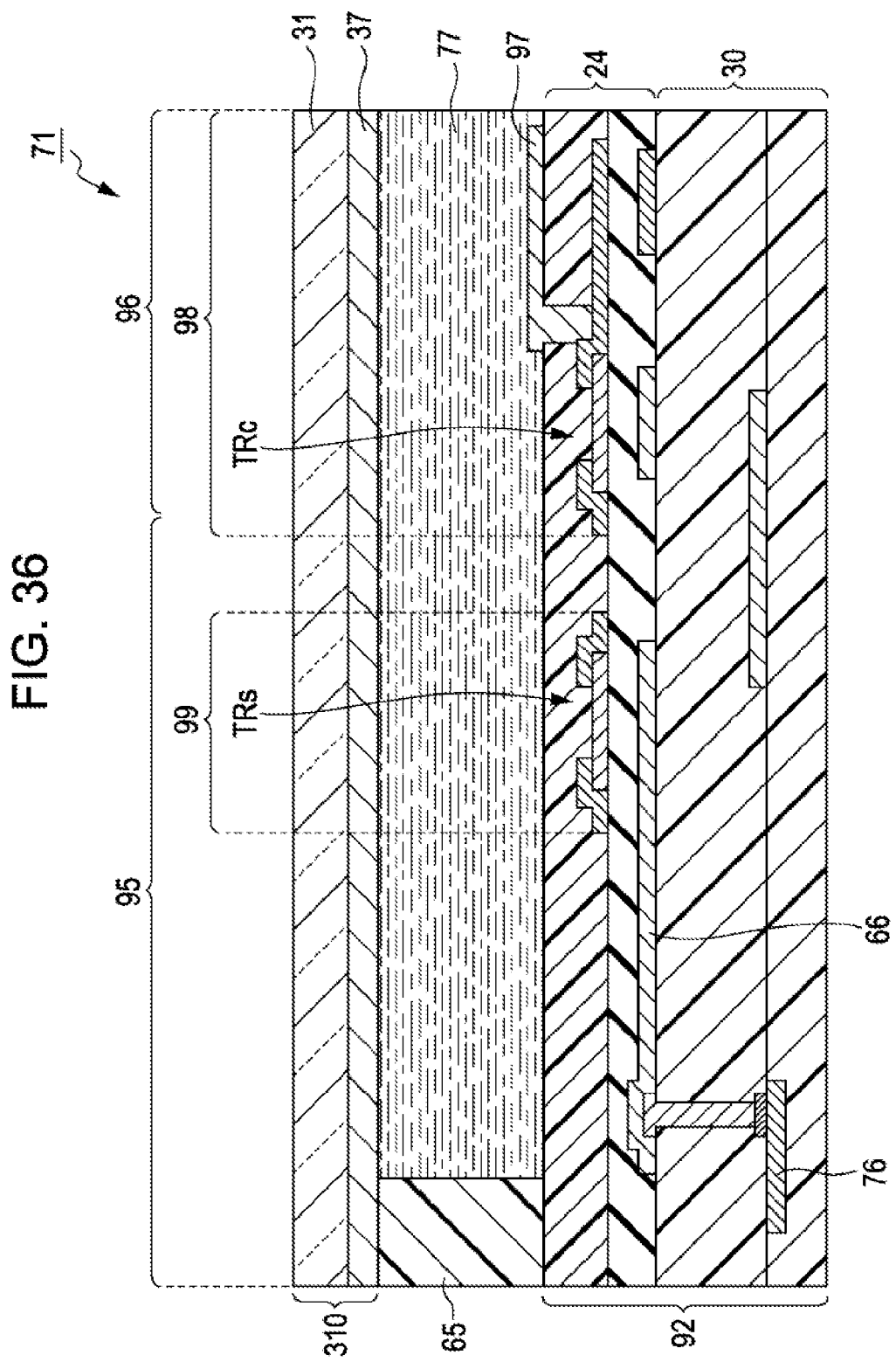
FIG. 36 is a cross-sectional view showing the configuration of a pressure-sensitive sensor.

FIGS. 35A, 35B, and FIG. 36 show an example in which a pressure-sensitive sensor such as the artificial skin of a robot is used. FIGS. 35A and 35B are diagrams showing an example in which a pressure-sensitive sensor is disposed at the fingertip of the robot. FIG. 36 is a cross-sectional view showing the configuration of the pressure-sensitive sensor.

As shown in FIGS. 35A, 35B, and 36, the pressure-sensitive sensor (electric apparatus) 70 disposed at the fingertip 74 of the robot is configured so as to include a plurality of detection pixels 71. The detection pixels 71 can be configured by using the component substrate according to one of the embodiments described above.

The detection pixel 71 includes a component substrate 92 that is formed by a first substrate 30 and a driving circuit layer 24 disposed on the first substrate 30, an opposing substrate 310 that includes an opposing electrode 37 on a second substrate 31, and a piezoelectric element 77 that is arranged between the component substrate 92 and the opposing substrate 310.

On the first substrate 30 within the detection area 96, a detection circuit 98 that includes a detection electrode 97 and a control transistor TRc is arranged. In addition, inside the first substrate 30 within the detection area 96, a wiring and the like that are used for configuring the detection circuit 98 are buried. Furthermore, in a non-detection area 95, a driving circuit 99 and a sealing member 65 are disposed. A scanning line 66 is connected to a driving IC 76 through the driving circuit 99. The driving circuit 99 operates in accordance with the control of the driving IC 76.

On the other hand, the opposing substrate 310 is configured to include the second substrate 31 and an opposing electrode 37 that is formed from carbon nanotubes disposed on the inner face (a face facing the piezoelectric element 77) of the second substrate 31. Here, the second substrate 31 is formed from PET having a thickness of 0.2 mm.

Between the component substrate 92 and the opposing substrate 310, the piezoelectric element 77 that is formed from a copolymer of trifluoroethylene and vinylidene fluoride, which has a thickness of 1 μm, is interposed. The copolymer of trifluoroethylene and vinylidene fluoride is an organic material and, similarly to the component substrate 92, can be bent. In addition, between the peripheral portions of the component substrate 92 and the opposing substrate 310, the sealing member 65 that is partitioned so as to surround the piezoelectric element 77 is arranged.

In the pressure-sensitive sensor 70 that is formed by including a plurality of the detection elements 71, a voltage is generated between the opposing electrode 37 and the pixel electrode 35 when external pressure is applied to each detection element 71, and, by detecting a change in the voltage, it is determined whether or not an object is brought into contact with the fingertip 74 of the robot.

Here, as the component substrate 92, one of the above-described embodiments can be used. Particularly, it is preferable to decrease the non-detection area by arranging the driving circuit 99, the driving IC 76, and the other electronic components 10 inside the detection area.

In addition, in this embodiment, the input/output of the detection signal output from the pressure-sensitive sensor, a driving input signal, and the like is performed by using the external connection electrodes 14 and 15 (not shown) arranged on the rear face of the first substrate 30. Accordingly, even when the pressure-sensitive sensor is used as shown in FIG. 36A, almost the entire face of the pressure-sensitive sensor 70 can be used as the detection area 96, whereby the detection area can be broadened. Furthermore, by configuring the first substrate 30 and the second substrate 31 with a material having elasticity such as rubber, the substrates can be bonded to a face having a complicated shape such as a palm without forming any gap therebetween. In addition, since the elasticity is improved, when the pressure-sensitive sensor is touched by a hand of a person, a natural feeling like a human body can be realized.

In addition, the piezoelectric material, the conductive film 36, and the protection layer 38 may be formed by using another organic or inorganic material not limited to the description presented above. A two-dimensional temperature sensor can be configured by using a pyroelectric material instead of the voltage material, and a two-dimensional optical sensor or an X-ray sensor can be configured by using a photoelectric conversion material. In addition, a configuration may be employed in which a change in the current value is detected. Furthermore, the pressure-sensitive sensor may be applied to any other electric apparatus.

Although the preferred embodiments of the invention have been described with reference to the accompanying drawings, it is apparent that the invention is not limited to the related examples. Thus, it is apparent that those skilled in the art can achieve various changed examples or modified examples within the scope of the technical concept written in the claims, and it is naturally understood that these belong to the technical scope of the invention.

In each embodiment described above, by burying elements other than the driving circuit layer inside the first substrate 30, four sides of the component substrate, that is, all four sides of the electric apparatus can be formed to be flexible. Accordingly, an electric apparatus that is thin and light like paper and has high flexibility can be realized, and a small-size and light-weight device owing to a decrease in the thickness of the entire device, a narrow frame, and the like and the robustness thereof can be realized. Therefore, the versatility of the electric apparatus is improved.

In the above-described example, a capsule-type electrophoretic material is used. However, the material is not limited thereto. In addition, a partition may be present as in a partition wall-type, and the partition may not be present. Furthermore, the configuration of the particles other than two types of particles including black particles and white particles charged with different polarities may be employed.

In addition, the shapes, the positions, the materials, and the like of portions, which are used for external connections, including the external connection electrodes 14 and 15 and the lid are not limited to those described above.

Furthermore, the electro-optical material that can be applied is not limited to the electrophoretic material. For example, a liquid crystal, an EL material, an electrowetting material, a MEMS material, or the like can be used.

In addition, the electronic component may be disposed on the outer side of the display area, and a configuration may be employed in which, by burying the electronic component to the lower side of the display area, the frame is extremely small.

The entire disclosure of Japanese Patent Application No. 2010-268710, filed Dec. 1, 2010 is expressly incorporated by reference herein.

What is claimed is:

1. A thin-film transistor forming substrate comprising:
a substrate that has flexibility or elasticity; and
a plurality of electronic components disposed so as to be buried inside the substrate, wherein
an arrangement gap between adjacent electronic components included in the plurality of electronic components is equal to or more than a length of one side of each one of the adjacent electronic components when viewed in plan view,
the substrate includes a plurality of base members,
a plurality of buried wirings is arranged between different base members, and
one buried wiring and another buried wiring are connected to each other through a plurality of contact holes in the base members that are disposed between the one buried wiring and the another buried wiring.

2. The thin-film transistor forming substrate according to claim 1, wherein the plurality of electronic components includes ICs, and an arrangement gap between a plurality of the ICs is equal to or more than a length of one side of each one of the ICs, and is more preferably equal to or more than three times the length of the one side.

3. The thin-film transistor forming substrate according to claim 1, wherein the plurality of electronic components is configured so as to include at least one of an IC, a capacitor, a resistor, and an inductor.

4. The thin-film transistor forming substrate according to claim 1,
wherein the substrate includes a plurality of laminated base members, and
each electronic component included in the plurality of electronic components is buried inside one of the plurality of laminated base members, inside a different laminated base member, or between base members that are adjacent to one another.

5. A semiconductor device comprising:
a substrate that has flexibility or elasticity; and
a semiconductor element that is formed on the substrate, wherein the substrate is formed from the thin-film transistor forming substrate according to claim 1.

6. The semiconductor device according to claim 5, wherein the semiconductor element is an active element.

7. An electric apparatus comprising:
a component substrate that has flexibility or elasticity;
an opposing substrate, which is arranged so as to face the component substrate, having flexibility or elasticity;
a functional element that is arranged between the component substrate and the opposing substrate;
a plurality of first electrodes that are disposed in the component substrate;
a second electrode that is disposed in the opposing substrate; and
a driving circuit that is used for driving the functional element,
wherein the component substrate is formed from the semiconductor device according to claim 5, and
wherein an electronic component is connected to the driving circuit.

8. The electric apparatus according to claim 7, wherein the functional element is a display element that has a display unit in which a plurality of pixels is arranged.

9. The electric apparatus according to claim 7, wherein at least one electronic component is disposed so as to overlap the functional element in the plan view.

10. The electric apparatus according to claim 7, wherein an external connection electrode connected to the electronic component is disposed on a face of the thin-film transistor forming substrate that is on a side opposite to the functional element.

11. The electric apparatus according to claim 10, wherein the external connection electrode is disposed so as to overlap the functional element in the plan view.

12. The electric apparatus according to claim 10, wherein an extended portion of the opposing substrate extends on a face of the component substrate that is located on a side opposite to the functional element, and the extended portion and the external connection electrode are connected to each other through a vertical conduction portion.

13. The electric apparatus according to claim 7,
wherein the functional element and the electronic component are connected to each other through a connection wiring, and
wherein a communication circuit that is a communication control unit and an antenna that is a communication unit connected to the communication circuit are disposed as electronic components, and the antenna is disposed in a same layer as that of the connection wiring.

14. The electric apparatus according to claim 7,
wherein a battery cell that is a power supply unit is disposed as the electronic component, and
wherein the battery cell is disposed on a face of the component substrate that is located on a side opposite to the functional element.

15. The electric apparatus according to claim 14, further comprising:
a concave portion that houses the electronic component in the component substrate, and
a lid portion that seals the concave portion.

16. The electric apparatus according to claim 7, wherein the component substrate has moisture-resistance for the functional element.

17. The thin-film transistor forming substrate according to claim 1, wherein the arrangement gap between the adjacent electrical components is equal to or more than three times the length of the one side of each one of the adjacent electrical components when viewed in plan view.

18. The thin-film transistor forming substrate according to claim 1, wherein the plurality of electronic components comprises a plurality of ICs.

* * * * *